US012664156B2

(12) United States Patent
Krishnan et al.

(10) Patent No.: US 12,664,156 B2
(45) Date of Patent: Jun. 23, 2026

(54) MULTI-AGENT ARTIFICIAL INTELLIGENCE SYSTEM WITH SHARED EXPERIENCE REPOSITORY

(71) Applicant: QpiAI India Private Limited, Bangalore (IN)

(72) Inventors: Aswanth Krishnan, Bengaluru (IN); Lakshya Priyadarshi, Lucknow (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/372,897

(22) Filed: Oct. 29, 2025

(65) Prior Publication Data

US 2026/0119479 A1 Apr. 30, 2026

(30) Foreign Application Priority Data

Nov. 30, 2024 (IN) .............................. 202441083019

(51) Int. Cl.
| | |
|---|---|
| *G06F 16/242* | (2019.01) |
| *G06F 16/22* | (2019.01) |
| *G06F 18/21* | (2023.01) |
| *G06F 18/22* | (2023.01) |

(52) U.S. Cl.
CPC ........ *G06F 16/243* (2019.01); *G06F 16/2237* (2019.01); *G06F 18/2178* (2023.01); *G06F 18/22* (2023.01)

(58) Field of Classification Search
CPC ............... G06F 16/243; G06F 16/2237; G06F 18/2178; G06F 18/22
See application file for complete search history.

(56) References Cited

U.S. PATENT DOCUMENTS

| | | | | |
|---|---|---|---|---|
| 11,776,542 | B1 * | 10/2023 | Bueche | ............... G10L 15/1822 704/231 |
| 11,893,994 | B1 * | 2/2024 | Tucker | .................... G06F 40/42 |
| 2024/0311639 | A1 * | 9/2024 | Hansen | .................. G06N 3/006 |
| 2024/0386328 | A1 * | 11/2024 | Schmidhuber | ......... G06N 3/092 |
| 2024/0412720 | A1 * | 12/2024 | Vasylyev | .......... G06F 16/90332 |
| 2025/0190762 | A1 * | 6/2025 | Severyn | .................. G06F 40/20 |
| 2025/0284971 | A1 * | 9/2025 | Li | ........................... G06N 3/092 |
| 2025/0322259 | A1 * | 10/2025 | Zadeh | .................. G06N 3/0985 |
| 2025/0378323 | A1 * | 12/2025 | Pang | ........................ G06N 3/08 |
| 2026/0030476 | A1 * | 1/2026 | Chandrasekaran | .... G06N 3/004 |

* cited by examiner

*Primary Examiner* — Huawen A Peng

(74) *Attorney, Agent, or Firm* — Foley & Lardner LLP

(57) ABSTRACT

Systems and methods for multi-agent artificial intelligence with shared experience repositories are disclosed. A system can obtain a set of actions generated by one or more language models based on a set of input data. The system can generate, using at least one reward model, a respective score for each action representing a degree to which the action satisfied a corresponding objective. The system can generate and store data records comprising the action data, corresponding input data, outcome data, and respective scores in a repository accessible to the language models. The system can generate a query according to an input context, select data records based on respective scores and similarity between the query and the records, and execute the language model using the selected record to generate an output action corresponding to the input context.

20 Claims, 7 Drawing Sheets

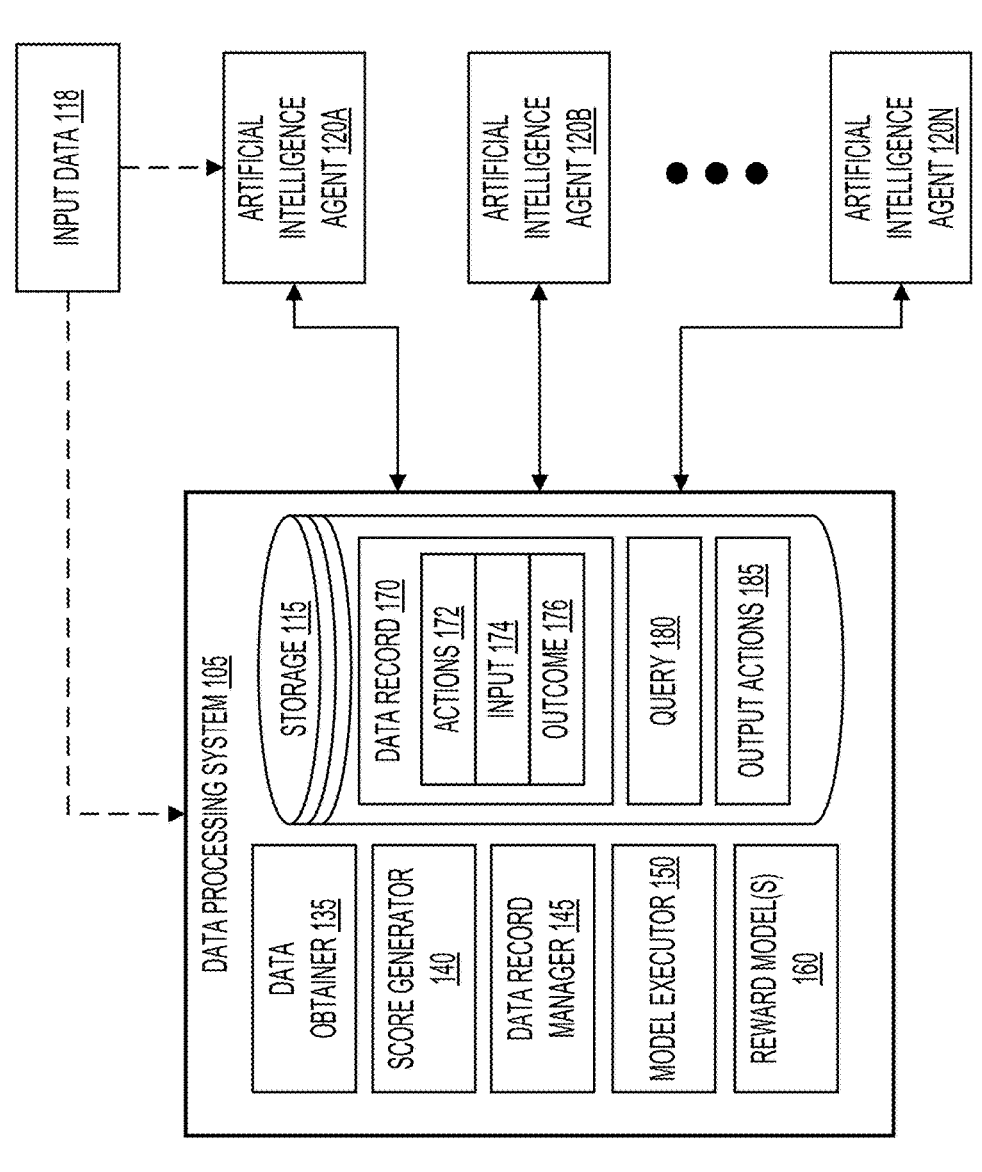
FIG. 1

200

```
┌─────────────┐   ┌─────────────┐              ┌─────────────┐
│ ARTIFICIAL  │   │ ARTIFICIAL  │              │ ARTIFICIAL  │
│INTELLIGENCE │   │INTELLIGENCE │   ● ● ●      │INTELLIGENCE │
│ AGENT 120A  │   │ AGENT 120B  │              │ AGENT 120N  │
└─────────────┘   └─────────────┘              └─────────────┘
```

INTERACT WITH ENVIRONMENT 202

GENERATE ACTION PATHS 204

EXECUTE REWARD MODEL 206

GENERATE DATA RECORDS 208

STORE IN SHARED STORAGE 210

FIG. 2

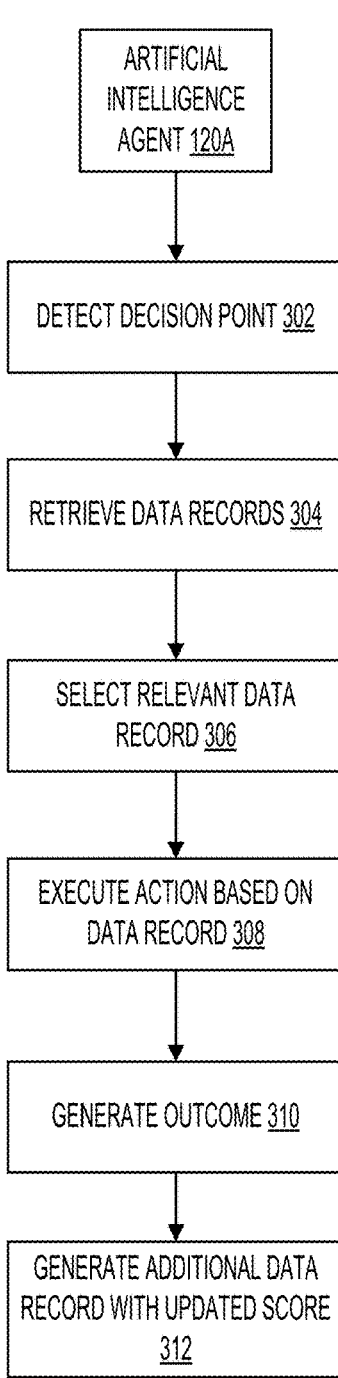
FIG. 3

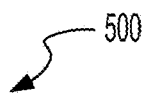

500

```
┌──────────────────────────┐
│  SIMULATE ENVIRONMENT AND │──────────────┐
│      CONTEXT 502          │              │
└──────────────────────────┘              │
            │                             │
            ▼                             ▼
┌──────────────────────────┐   ┌──────────────────────────┐
│   EXPERIENCE GENERATION   │   │  FINE-TUNING OPERATIONS 512│
│      PROCESS 504          │   └──────────────────────────┘
└──────────────────────────┘              ▲
            │                             │
            ▼                             │
┌──────────────────────────┐              │
│    STORED DATA RECORDS    │──────────────┘
│  ENCODING EXPERIENCES 506 │◄───────┐
└──────────────────────────┘        │
       │                            │
       ▼                            │
┌──────────────────────┐            │
│  TESTING OPERATIONS   │           │
│        508           │           │
└──────────────────────┘           │
       │                            │
       ▼                            │
┌──────────────────────┐           │
│ RETROSPECTIVE SCORING │───────────┘
│        510           │
└──────────────────────┘
```

FIG. 5

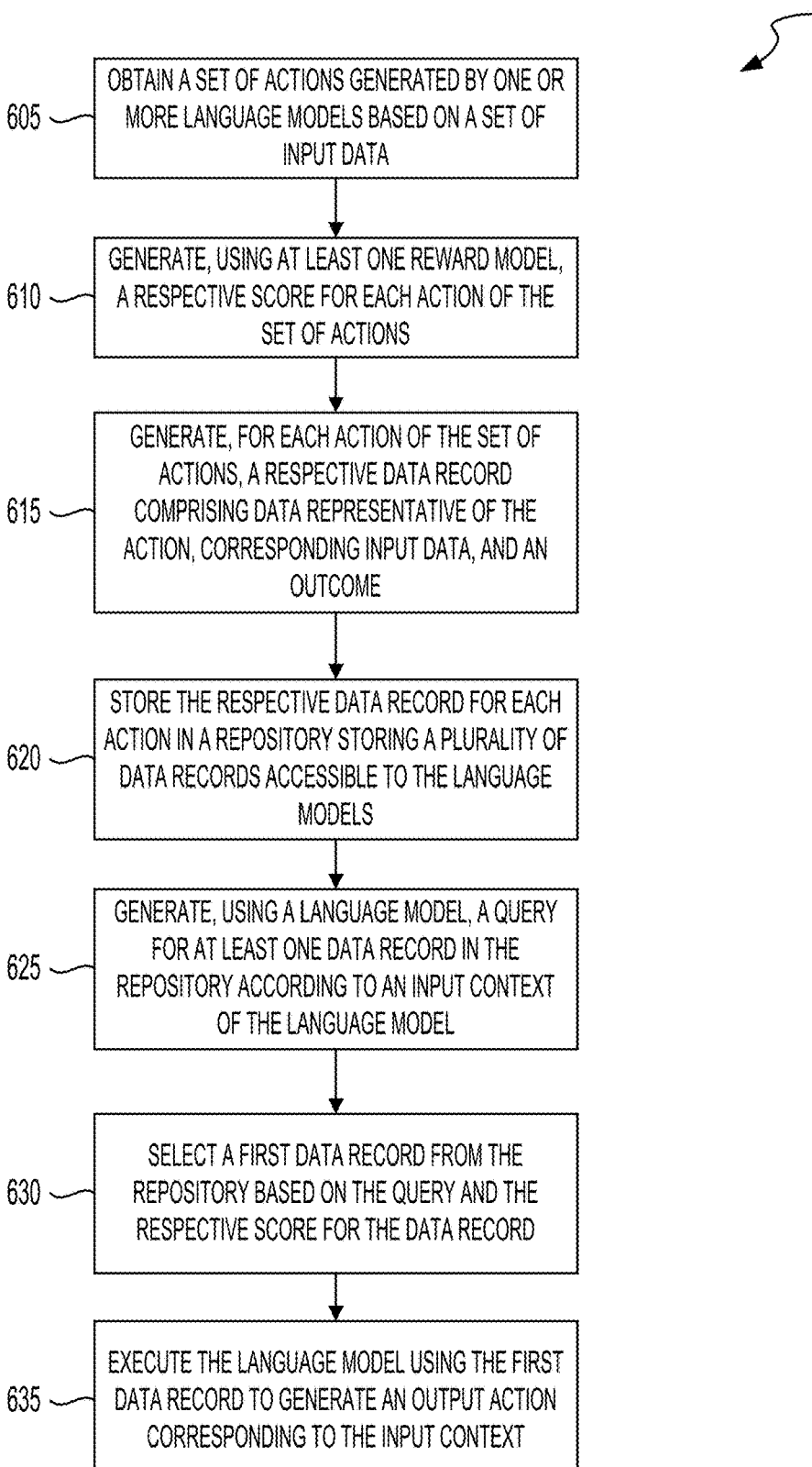

605 — OBTAIN A SET OF ACTIONS GENERATED BY ONE OR MORE LANGUAGE MODELS BASED ON A SET OF INPUT DATA

610 — GENERATE, USING AT LEAST ONE REWARD MODEL, A RESPECTIVE SCORE FOR EACH ACTION OF THE SET OF ACTIONS

615 — GENERATE, FOR EACH ACTION OF THE SET OF ACTIONS, A RESPECTIVE DATA RECORD COMPRISING DATA REPRESENTATIVE OF THE ACTION, CORRESPONDING INPUT DATA, AND AN OUTCOME

620 — STORE THE RESPECTIVE DATA RECORD FOR EACH ACTION IN A REPOSITORY STORING A PLURALITY OF DATA RECORDS ACCESSIBLE TO THE LANGUAGE MODELS

625 — GENERATE, USING A LANGUAGE MODEL, A QUERY FOR AT LEAST ONE DATA RECORD IN THE REPOSITORY ACCORDING TO AN INPUT CONTEXT OF THE LANGUAGE MODEL

630 — SELECT A FIRST DATA RECORD FROM THE REPOSITORY BASED ON THE QUERY AND THE RESPECTIVE SCORE FOR THE DATA RECORD

635 — EXECUTE THE LANGUAGE MODEL USING THE FIRST DATA RECORD TO GENERATE AN OUTPUT ACTION CORRESPONDING TO THE INPUT CONTEXT

MULTI-AGENT ARTIFICIAL INTELLIGENCE SYSTEM WITH SHARED EXPERIENCE REPOSITORY

CROSS-REFERENCES TO RELATED APPLICATIONS

This application claims the benefit of and priority to Indian Provisional Patent Application No. 202441083019, filed Nov. 30, 2024, the content of which is incorporated herein by reference in its entirety for all purposes.

BACKGROUND

Artificial intelligence systems can execute language models to implement various tasks. In various systems, multiple sets of instructions may be processed by language models to implement the functionality of different multiple computational agents to process data, generate insights, and perform decision-making tasks across distributed environments. These systems may rely on machine learning techniques for training and improvement, often utilizing large datasets and feedback mechanisms to refine predictive accuracy. However, coordinating information sharing and learning across multiple agents efficiently remains a significant challenge.

SUMMARY

Artificial intelligence (AI) systems, such as those that implement large language models, can use different sets of instructions to execute agents. Instructions for agents can define a particular role and/or actions that the corresponding agent is to perform. Certain agents may generate instructions to execute tools or invoke functions, which may retrieve or otherwise access additional data that is not present in the training dataset used to train the language model implementing the agent. Doing so can enable language models to execute operations using data that they have not been exposed to through training or through user input. Conventional systems rely on static databases, such as vector databases, to provide this additional contextual data. However, these collections of data are typically unstructured. Retrieval operations performed over large, unstructured collections can exhibit substantial latency. Such additional context information stored by conventional solutions is generally static and includes information particular domains only, and lacks information relating to how agents are to use or process the information in connection with specific tasks.

The techniques described herein can implement a shared experience repository that can store agent-generated outputs in multiple structured formats for subsequent access and optimization. In some implementations, the repository can maintain both textual representations suitable for deterministic lookup and semantic vector representations derived through embedding models for similarity-based retrieval. Metadata elements such as agent identifiers, task domains, and temporal indicators can facilitate filtering and ranking operations to improve retrieval and output accuracy. Ranking may be implemented according to scores generated using reward models, which can assign composite scores generated from symbolic evaluation, human preference data, and/or simulation-based testing. By implementing these techniques, the systems and methods of the present disclosure facilitate efficient experience management among multiple agents performing decision-making and/or training tasks in arbitrary domains.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1 is a block diagram illustrating a data processing system for managing shared experience repository and retrieval among multiple artificial intelligence (AI) agents, in accordance with one or more implementations;

FIG. 2 is a flow diagram illustrating an example process for generating and storing experiences during a training phase for a shared experience repository, in accordance with one or more implementations;

FIG. 3 is a flow diagram illustrating an example process for testing and evaluating experiences stored in a shared experience repository, in accordance with one or more implementations;

FIG. 5 is a flow diagram illustrating an example process for implementing self-improvement using data in a shared experience repository, in accordance with one or more implementations;

FIG. 6 is a flow chart illustrating a method for generating, storing, retrieving, and using experience data records in a shared repository using AI agents, in accordance with one or more implementations.

DETAILED DESCRIPTION

Figure 4:
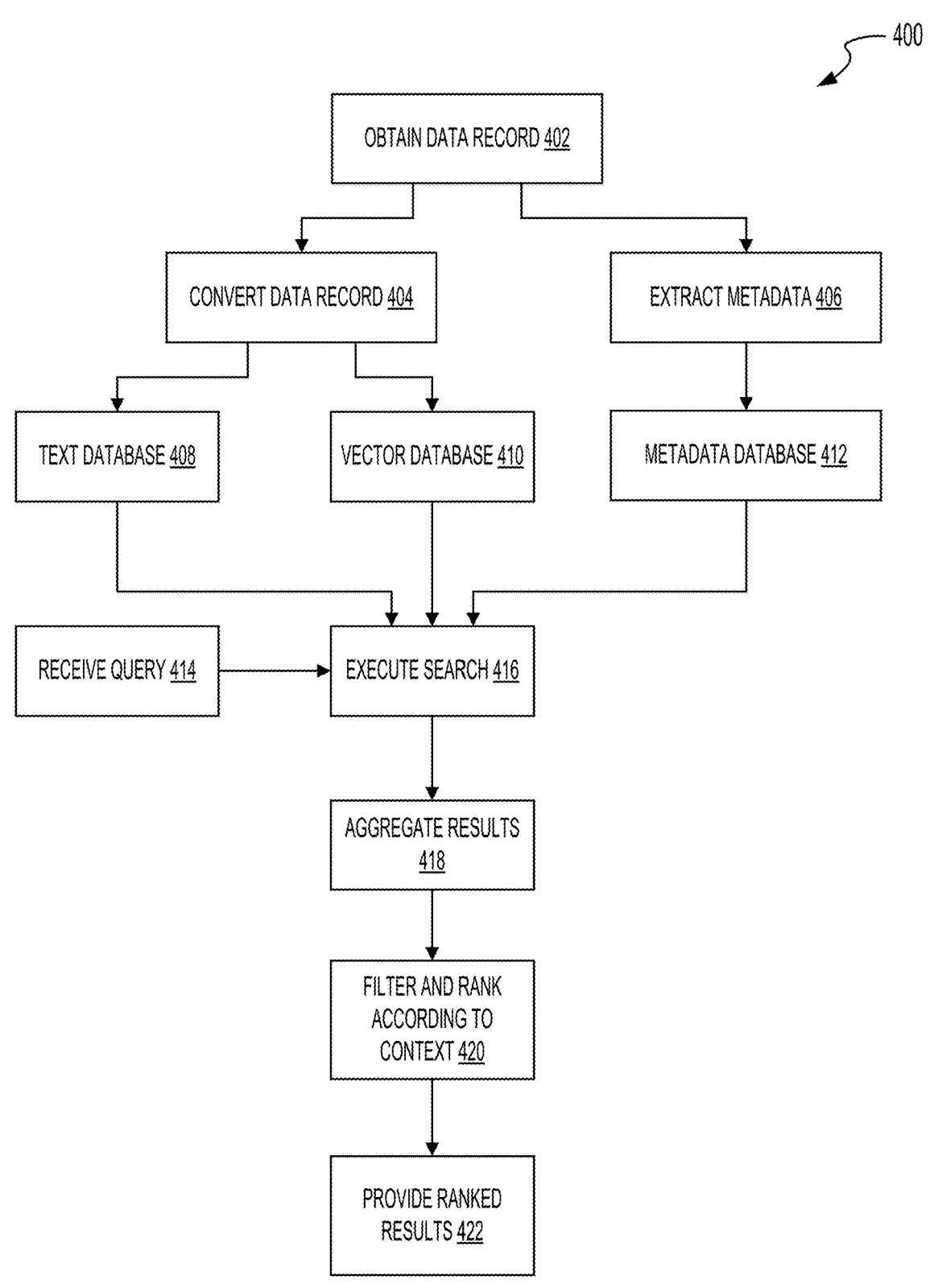
FIG. 4 is a flow diagram illustrating a process for storing and accessing experience data from a shared experience repository, in accordance with one or more implementations.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

This disclosure relates to techniques for coordinated learning and experience sharing among artificial intelligence systems that implement multiple independent artificial intelligence (AI) agents. AI agents can execute task-specific instructions, perform tool-based actions, and/or generate context-dependent outputs via large language models and/or other machine learning architectures. Each AI agent in such multi-agent systems can process incoming data and generate corresponding actions or evaluations to satisfy assigned objectives. In conventional configurations, individual agents operate using static sources of reference data, such as text or vector databases, which provide contextual information during execution. Such sources generally include pre-inserted data formatted as unstructured text or embeddings, and retrieval operations performed over large, unstructured datasets can result in high latency and limited contextual precision. Furthermore, conventional data collections typically remain static and lack operational data reflecting how agents interact with dynamic environments or coordinated processes.

Existing approaches are often constrained by the absence of interaction-aware information sharing among multiple AI agents executing coordinated tasks/operations. Each agent tends to generate local experiences that are not shared in a unified format across other agents or related systems. As a result, decision accuracy and processing efficiency can degrade as each agent independently repeats similar operations without leveraging collective knowledge. Static retrieval architectures that rely solely on fixed content cannot capture changing operational context of multiple autonomous agents. Consequently, distributed systems may maintain parallel but disconnected contexts and information, which preventing multiple agents from operating together efficiently.

The techniques described herein provide a shared experience repository that provides multi-format storage and retrieval of AI agent-generated outputs paired with inputs and contextual metadata. The shared repository can maintain both textual representations for deterministic retrieval operations and vector representations for semantic similarity operations. Metadata included in the repository may include features such as agent identifiers, domain identifiers, timestamps, evaluation scores, and/or tool/function references, which may be used for filtering or selecting relevant experiences for detected decision points. During runtime, an agent can generate a query that is used to determine whether to perform lexical retrieval, semantic similarity retrieval, or both.

The shared repository implemented according to the techniques described herein can be scored or ranked using one or more evaluation models that generate composite scoring across multiple evaluation sources. Such reward models can include human preference assessments, symbolic evaluations, physical task completions, or autonomous meta-agent scoring. The composite reward value can function as a quantitative quality indicator to facilitate subsequent filtering and re-use of experiences during future agent operations. In some implementations, the shared store can be used to perform autonomous self-improvement processes, including but not limited to episodic replay, self-play (e.g., among multiple agents executing a common set of operations or coordinated tasks), and/or retrospective scoring (e.g., according application-specific, long-term criteria, etc.), to update previously stored experiences. Such stored experiences can be further used as training data to fine-tune and/or update the AI agents, such that the AI agents can improve with respect to application-specific accuracy autonomously over time.

The systems and methods described provide several technical advantages. For example, by encoding agent experiences across textual, semantic, and metadata dimensions, retrieval operations can maintain high precision even at scale. Additionally, providing shared access to semantically indexed experiences can reduce redundant processing across agents, minimizing computational overhead and latency during query resolution. Moreover, continuous self-improvement processes can automatically improve the performance of AI agents over time as they are used to interact with simulated or real-world environments, rather than relying on manually curated training datasets as in conventional approaches. The approaches described herein can thereby improve retrieval speed, decision accuracy, and contextual relevance across multiple AI agents for any type of task or coordinated operation.

Referring now to FIG. 1, illustrated is a block diagram of an example system 100 for managing a shared experience repository and retrieval among multiple artificial intelligence (AI) agents 120A-120N, in accordance with one or more implementations. The system 100 can include a data processing system 105, input data 118, and one or more AI agents 120A-120N (sometimes generally referred to as "AI agent(s) 120"). The data processing system 105 can include a data obtainer 135, a score generator 140, a data record manager 145, a model executor 150, one or more reward models 160, and a storage 115. The storage 115 can include one or more data records 170, actions 172, input 174, and outcome 176. The storage 115 can also include a query 180 and one or more output actions 185.

The data processing system 105 can include at least one processor and a memory (e.g., a processing circuit). The memory can store processor-executable instructions that, when executed by processor(s), cause the processor(s) to perform one or more of the operations described herein. The processor(s) may include a general-purpose processor (e.g., a central processing unit (CPU), etc.), an application-specific integrated circuit (ASIC), a graphics processing unit (GPU), a tensor processing unit (TPU), a field-programmable gate array (FPGA), the like, or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, and/or any other suitable memory from which the processor(s) can read instructions and/or data. The instructions may include code from any suitable computer programming language. The data processing system 105 can include one or more computing devices or servers that can perform various functions as described herein. The data processing system 105 can include any or all of the components and perform any or all of the functions of any computing system described herein.

The system 100 can include one or more AI agents 120 that can be implemented using one or more language models executing on a computing system. Such language models may be implemented using any suitable type of machine-learning model, including but not limited to generative pre-trained transformer (GPT) models, deep neural network models, other transformer-based models, recurrent neural network models, and/or any other type of machine-learning model trained/updated to process natural language text data and/or any other type of data described herein. Each AI agent 120 can operate as a language-processing component (e.g., hardware, software, combinations thereof) that can process textual or symbolic input, generate corresponding linguistic or structured output, and apply model-internal representations to perform cognitive or analytical reasoning. In some implementations, each AI agent 120 can include a distinct copy, derivative, or fine-tuned variant of a base language model to specialize in specific operational domains. For example, an AI agent 120 may be instantiated using a large language model that has been fine-tuned to perform computational reasoning, code evaluation, or process coordination across multiple domains, among others. In some implementations, the agents 120 may share common architectural weights but may differ in prompt/instructions/configurations.

In some implementations, one or more of the AI agents 120 can be executed by the data processing system 105. In some implementations, one or other AI agents 120 may be executed by one or more computing systems in communication with the data processing system 105. For example, the data processing system 105 can use the model executor 150 to execute one or more of the AI agents 120. In some implementations, the one or more computing systems executing the agents 120 may exchange context data, intermediate tensors, attention embeddings, and/or semantic vectors to maintain synchronized operational states. The communication between remote agents 120 and/or the data processing system 105 can occur via one or more network interfaces that can facilitate inputs, outputs, intermediate data, and/or corresponding metadata for any of the operations described herein.

In some implementations, each AI agent 120 can operate according to a system-level or task-specific prompt that directs a language model to perform identified functional behavior. The language model used to implement an AI agent 120 can process the system prompt along with additional contextual tokens (e.g., tokenized input data 118), reference data, and/or retrieved experience data records 170 and can generate task-specific outputs such as output actions 185, responses, and/or intermediate reasoning steps. In some implementations, a persistent context window can be maintained for one or more of the AI agents 120, which can include includes system instructions/prompt(s) and/or dynamic contextual data retrieved via the data record manager 145 and/or any other component described herein. For example, an AI agent 120 can process a prompt directing the AI agent 120 to compose an analytical summary derived from a stored experience data record 170, and generate a tool invocation command as an output action 185, which may be executed via the data processing system 105 to carry out one or more operations.

In some implementations, the language models implementing the AI agents 120 can execute instructions that facilitate tool calling through structured outputs (e.g., output actions 185, etc.) that invoke defined application program interfaces (APIs), commands, and/or other computer-executable instructions. For example, an AI agent 120 may generate a structured output encoded with a tool-specification token that aligns with a standardized execution protocol such as the Model Context Protocol (MCP). Under such implementation, the agent output can instruct the data processing system 105 or a connected computing system to execute tool functions that access external services or computational resources. The AI agents 120 can receive input data 118 from any suitable source or interface, such as a user device communicating with the data processing system 105 and/or the computing system that executes the language models of the AI agents 120, a network gateway/routing system, and/or a process communication interface (e.g., invoked via inter-process communication) that provides the input data to the AI agents 120, among others.

In one example implementation, the AI agents 120 can execute tasks within a global supply chain management solution that facilitates management of manufacturing, warehousing, transportation, and distribution operations. Furthering this example, the data processing system 105 can instantiate multiple types of AI agents 120, such as manufacturing optimization agents, inventory management agents, transportation and routing agents, demand forecasting agents, and/or sustainability compliance agents, each of which may execute application-specific tasks to carry out supply chain management operations. Each AI agent 120 can operate according to a corresponding functional objective (e.g., specified via corresponding system prompts/instructions) while maintaining access to the shared experience repository of data records 170 stored in the storage 115. For example, a manufacturing optimization agent can be instructed to retrieve data records 170 describing prior production scheduling strategies and outcome metrics (e.g., outcomes 176), and use those data records 170 to determine improved manufacturing throughput adjustments for a specific production line. In some implementations, the transportation and routing agent can access historical shipment outcomes (e.g., outcomes 176) from corresponding data records 170 to generate one or more routing plans across regional distribution centers that reduce idle fleet time and fuel consumption. Each AI agent 120 can generate output that is used to update the storage 115 with additional data records 170, as described in further detail herein.

Furthering the above example, the AI agents 120 can operate cooperatively through the shared experience repository of data records 170 maintained in the storage 115 to execute compound objectives across distributed systems. For example, demand forecasting agents and inventory management agents may exchange results through the shared repository such that demand forecasts dynamically modify stock replenishment decisions. In another example, sustainability compliance agents may verify stored outcomes of manufacturing optimization agents to determine emissions trends for specific facilities. Other cooperative operations are also possible to implement any type of system involving multiple tasks/operations.

In another example implementation, the AI agents 120 can implement an adaptive traffic management system for a metropolitan region. The data processing system 105 can execute approximately one thousand artificial intelligence agents 120, each corresponding to an individual intersection, arterial link, or road segment. Each artificial intelligence agent 120 can access the shared experience repository in the storage 115, which can include historical traffic patterns, incident reports, and computed outcomes from previous management actions. The reward models 160 can assign scores using parameters such as mean vehicle velocity, intersection wait time, pedestrian crossing safety, and air quality measurements. The artificial intelligence agents 120 can receive real-time data from local sensors, cameras, and connected vehicle interfaces, combine that data with weather conditions obtained through external sources, and query the shared experience repository for comparable contexts. For example, an artificial intelligence agent 120 managing a major intersection can retrieve data records 170 representing similar congestion events and apply corresponding timing adjustments to local traffic signals to mitigate delay accumulation.

The system 100 can include the input data 118. The input data 118 can be any form of data that can be converted into a format processable by the AI agents 120. The input data 118 can be received under conditions where the AI agents 120 are to generate outputs (e.g., output actions 172, etc.), perform decision-making operations, and/or evaluate stored experience data records 170 in the storage 115. In some implementations, the input data 118 can be received from one or more computing systems that provide information to the data processing system 105. For example, the input data 118 can be received via one or more API calls, through inter-process communication, from external computing systems operating remote processes via one or more networks, and/or through operator input provided to an interface of the data processing system 105. The input data 118 can be ingested singly or in batches, in some implementations.

In some implementations, the input data 118 can include any type of content that can be provided or encoded for computational processing. For example, the input data 118 can include text, audio, video, image data, sensor readings, and/or any combinations thereof. The input data 118 can be generated via real-world environments and/or simulated environments/systems. Non-limiting examples of sources of input data 118 can include sensor feeds, test environments, robotic simulations, and/or digital twins representing operational processes. In some implementations, the input data 118 can include parameters and/or contextual indicators that correlate to real-time environmental variables such as temperature, velocity, and/or spatial orientation. The data processing system 105 and/or the computing systems implementing the AI agent(s) 120 can receive such content in raw and/or semi-structured form and can pre-process the input data 118 for use by the AI agents 120 according to the context.

The input data 118 can be pre-processed into formats compatible with the AI agents 120 prior to being introduced into a model execution stage. In some implementations, preprocessing can include tokenization, normalization, feature extraction, or dimensional encoding of the raw data into tensor, vector, or sequence formats suited for large language model processing. The input data 118 can further include metadata identifying properties such as a time of receipt, a data source identifier, or an operational domain classification. For example, metadata may specify that a given data instance originates from a particular environment sensor, simulation run, or human operator session. Once formatted, the input data 118 can be supplied to one or more AI agents 120 as model input to generate corresponding reasoning steps, evaluations, or output actions 185 according to their operational prompts or assigned objectives.

The input data 118 can be retrieved in response to one or more tool functions invoked by one or more AI agents 120. For example, during operation, one or more computing systems executing an AI agent 120 may execute instructions to retrieve input data 118 from one or more sources. In some implementations, the sources of input data 118 may correspond to the operations of a respective AI agent 120, and the corresponding input data 118 may include information that is to be processed by that agent 120. In another example, one or more of the AI agents 120 can generate a structured output action 172 that specifies a tool identifier, a set of input parameters, and/or one or more retrieval endpoints associated with external or internal data sources. In some implementations, the data processing system 105 and/or the computing system executing the AI agent 120 can execute the specified tool function and obtain the input data 118 from a corresponding database, networked service, and/or simulated environment. For example, an AI agent 120 executing an operational instruction related to environmental monitoring can invoke a data acquisition tool function that retrieves sensor readings representing temperature, humidity, and/or motion parameters, among others. In some implementations, the input data 118 retrieved via the invoked tool function can be supplied to the AI agent 120 as tokenized content for subsequent reasoning and/or classification.

In some implementations, scripts or functions associated with the AI agents 120 can issue retrieval calls to obtain the input data 118 from one or more information sources (e.g., concurrently, sequentially, combinations thereof, etc.). For example, an AI agent 120 (and/or a computing system executing such agent 120) that executes an economic forecasting instruction can initiate a script that retrieves data from one or more financial databases and/or market feeds/systems. Similar operations may be performed to obtain information corresponding to any suitable domain that may be processed via the AI agents 120. In some implementations, if disparate data is obtained from multiple or the same information source, the retrieved data may be aggregated and/or encoded, and provided to the AI agent 120 as the input data 118. In some implementations, the tool or script invoked by the AI agent 120 can apply preprocessing operations such as normalization or vector conversion of the input data 118 before providing the processed input data 118 to the AI agent(s) 120. For example, the invoked function may transform text records into embeddings.

The data processing system 105 can include or be in communication with the storage 115. The storage 115 can be a computer-readable memory that can store or maintain any of the information described herein. The storage 115 can maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. The storage 115 can be accessed by the components of the data processing system 105, or any other computing device described herein, via a network. In some implementations, the storage 115 can be internal to the data processing system 105. In some implementations, the storage 115 can exist external to the data processing system 105 and may be accessed via a network by the data processing system 105. For example, the storage 115 may be distributed across many different computer systems (e.g., a cloud computing system) or storage elements and may be accessed via the network or a suitable computer bus interface.

The data processing system 105 can store, in one or more regions of the memory of the data processing system 105, or in the storage 115, the results of any or all computations, determinations, selections, identifications, generations, constructions, or calculations in one or more data structures indexed or identified with appropriate values. Any or all values stored in the storage 115 may be accessed by any computing device described herein, such as the data processing system 105, to perform any of the functionalities or functions described herein. In implementations where the storage 115 forms a part of a cloud computing system, the storage 115 can be a distributed storage medium in a cloud computing system and can be accessed by any of the components of the data processing system 105 or any other computing devices described herein.

The storage 115 can operate as a shared experience repository that enables coordinated access to operational data generated by the AI agents 120. The storage 115 can maintain a continuously expanding collection of agent experiences stored as data records 170, as described in further detail herein. One or more of the AI agents 120 can access the storage 115 to retrieve previously generated data records 170 representing experiences (e.g., via the corresponding actions 172, the input 174, and/or the resulting outcome 176). In some implementations, the data records 170 in the storage 115 can be partitioned into regions that correspond to different operational domains and/or agent identifiers, which can facilitate selective retrieval according to context. For example, an AI agent 120 assigned to a traffic optimization domain can access only the portion of the storage 115 that includes data records 170 associated with transportation-related actions, while another AI agent 120 can retrieve a different subset relevant to financial analysis. Filtering/searching operations may also be performed to select relevant data records 170. The storage 115 can permit simultaneous read and write operations by multiple AI agents, in some implementations.

The storage 115 can include one or more data records 170 that represent stored experiences generated using AI agents 120 operating within the system 100. Each data record 170 can include structured elements that describe the operational context and the corresponding outputs of one or more agent interactions (e.g., the output actions 172). In some implementations, each data record 170 can encode information representing an agent-specific experience such as decision outcomes (e.g., outcomes 176), context data (e.g., input 174), or response rationales (e.g., actions 172 and any associated reasoning output, etc.) generated using input data 118 from simulated or real-world environments and/or data from other AI agents 120. For example, the data record 170 can include information describing one or more actions 172, inputs 174, and outcomes 176 associated with a completed task cycle performed by one or more AI agents 120. Each data record 170 can be stored in the storage 115 using a suitable storage/organization scheme. In one non-limiting example, the data records 170 (and/or the data thereof) can be stored to group related experiences according to application domain, AI agent 120 identifier, and/or operational phase (e.g., an application/domain specific processing stage/phase, etc.). In some implementations, the data record 170 can be categorized by task domain identifiers and/or application tags that delineate one or more functional contexts (e.g., forecasting, diagnostics, resource allocation, etc.).

Each data record 170 can be indexed in the storage 115 according to one or more textual and/or vector keys that facilitate subsequent retrieval. The text-based indexing can employ structured text records that permit deterministic matching based on lexical identifiers or metadata fields. In some implementations, a corresponding vector representation of each data record 170 can be generated using one or more embedding models and stored in an associated vector database region within the storage 115. For example, a combined architecture may maintain text indices in a text database and semantic embeddings in a vector database that operate jointly to enable both direct keyword matching and semantic similarity searches. Retrieval of the data record 170 can occur through text-based lookup operations or through vector similarity retrieval processes such as cosine-distance or nearest-neighbor ranking. Metadata associated with each data record 170 can include but are not limited to identifiers such as agent ID (e.g., agent type, etc.), task domain (e.g., which may correspond to a subset of the AI agents 120), timestamp, reward value(s), environmental state marker, and/or tool usage identifiers, among others. In some implementations, such metadata can define filtering attributes used to select subsets of data records 170 and can further enable ranking, re-scoring, or update operations carried out through the processes described in connection with FIGS. 2-5.

Each data record 170 can include one or more inputs 174 representing the input context that preceded the generation of a corresponding action 172 by an AI agent 120. The inputs 174 can include structured or unstructured data received from simulated or real-world environments that are processed by a language model to form the decision-making context for that AI agent 120. In some implementations, the inputs 174 can be stored as tokenized text sequences, numeric parameter arrays, image tensors (e.g., for image/video data, etc.), and/or sensory data vectors, among other data formats. For example, when the AI agent 120 operates in a robotics application, the inputs 174 may include encoded positional data, velocity metrics, and environmental sensory readings preprocessed into model-readable tensor form. The inputs 174 can be indexed or stored using schema identifiers that correspond to the originating environment or simulation run, facilitating later retrieval and correlation within the storage 115.

In some implementations, the inputs 174 can further include metadata describing interaction context between the AI agent 120 and the simulated or operational environment that produced the decision event. For example, the inputs 174 can specify elements of a user prompt sequence, system-level prompt variables, and/or configuration state tokens defining the operational conditions for the agent prior to execution of the corresponding action 172 for the corresponding experience represented by the data record 170. The inputs 174 can include both explicit data values and embedded representations derived from one or more embedding models that convert language-based inputs into numerical vectors for language model processing. In some implementations, the inputs 174 can identify acquired information (e.g., input data 118) including but not limited to sensor feeds, databases/data sources, and/or previously retrieved experience data records 170 to reproduce the full context under which the decision was generated. Each stored instance of the inputs 174 thereby preserves the totality of the input data contributing to a specific interaction or decision process for the experience encoded by the data record 170.

Each data record 170 can include one or more actions 172 that define the operations executed by an artificial intelligence agent 120 in response to specific input 174 and contextual conditions. The actions 172 can represent executable instructions, tool invocations, or control parameters that cause measurable effects within a corresponding simulated or real environment. In some implementations, an action 172 can correspond to a command sequence produced by a language model to invoke an API and/or a system tool that performs a defined computational or physical process. For example, an action 172 can trigger the execution of an environmental control function, initiate a data retrieval from a networked service, or modify operational parameters of a system process based on reasoning produced by the artificial intelligence agent 120.

In some implementations, each action 172 can be recorded in association with a timestamp. The corresponding input 174 that result in the selection/execution of the action 172, and the resulting outcome 176 associated with the action 172. In some implementations, the actions 172 can encompass any form of operation that generates an effect measurable as an outcome 176. For example, in a traffic management implementation, the actions 172 can include modification of traffic light timing intervals, assignment of temporary lane reversals, and/or issuance of variable speed limit updates for designated roadway segments. In another example, the actions 172 can represent actuator commands in a robotic process, parameter adjustments in a simulation loop, and/or function calls that modify system configuration states. Each action 172 can be encoded as part of the experience represented by the data record 170. Actions 172 can be stored in a similar format as the outcome actions 185 described in further detail herein.

Each data record 170 can include one or more outcomes 176 that represent measurable results or effects generated in response to a corresponding action 172 applied in response to a corresponding input 174. Each outcome 176 can be stored in association with the corresponding action 172 and input 174 for which the outcome 176 was measured/derived. In some implementations, an outcome 176 can represent a computed variable, a textual response, and/or a physical parameter measured from an operational environment. For example, the outcome 176 can include sensor readings such as temperature, positional accuracy, and/or velocity derived from robotic movements executed according to the action 172. In another example, the outcome 176 can include linguistic and/or numerical outputs derived from simulated and/or physical environments affected by the actions 172 generated via the AI agents 120. In some implementations, the outcome 176 can include environment readings obtained as input data 118 following execution of the corresponding action 172.

Each outcome 176 can include metadata identifying the properties of the result and/or corresponding contextual parameters, such as a timestamp, a measurement unit, an evaluation identifier, and/or a reference/identifier to a simulation environment or physical system affected by execution of the corresponding actions 172. In some implementations, the metadata associated with the outcome 176 can further include a categorical type, such as physical sensor output and/or computed performance indicator, among others. For example, an outcome 176 derived from a robotic simulation can include data specifying torque measurements and positional error margins. Each outcome 176 can be stored in association with one or more scores generated by reward models 160. The respective score can represent a degree to which the action 172 satisfied a corresponding objective for the AI agent 120 (e.g., where the object corresponds to a decision point derived from the input data, etc.).

Each data record 170 can be encoded as a textual representation, a vector representation, or a combination of both formats to facilitate retrieval and/or evaluation of the corresponding actions 172, inputs 174, and outcomes 176 thereof. The textual representation can store the actions 172, the input 174, and/or the outcomes 176 as structured language entries that facilitate deterministic keyword and/or field-based retrieval. For example, the textual representation can include delimited fields specifying command sequences representing the actions 172, contextual tokens identifying the input 174, and/or response tokens describing the outcome 176 as recorded by the corresponding AI agent 120. In some implementations, the textual representation may be stored according to a predetermined format, such as a JSON format, an XML format, and/or a YAML format, among others.

In some implementations, the data records 170 can be converted into a vector representation (e.g., as described in connection with FIG. 4) generated by an embedding model that encodes the semantic content of the actions 172, input 174, and outcome 176 in a unified latent space for similarity-based comparison. For example, a multidimensional embedding may be generated for one or more components (e.g., the actions 172, the input 174, the outcome 176, etc.) of the data record 170. In some implementations, the embeddings may be aggregated into a composite vector that preserves contextual dependencies among the components of the data record 170. In some implementations, the data record 170 can contain multiple actions 172 and multiple outcomes 176 corresponding to a single input 174 or a sequence of task stages, such as when a complex operation produces successive responses subject to incremental evaluation. Each of the actions 172 and corresponding outcomes 176 can be individually and/or jointly encoded in text and/or vector format to facilitate selective retrieval and/or evaluation as described in further detail herein.

The storage 115 can include one or more queries 180 that represent data retrieval instructions generated to obtain relevant data records 170 from storage 115 for processing by the AI agent 120. Each query 180 can correspond to a data retrieval process initiated by an AI agent 120. Such retrieval operations may be initiated, for example, when the AI agent 120 detects a decision point derived from the input data 118 and/or other contextual variables associated with an operational state of the AI agent 120 (e.g., reasoning output, etc.). The query 180 can specify one or more parameters such as action identifiers, domain identifiers, similarity thresholds, reward score boundaries, and/or metadata filters that can be used to determine which subset of data records 170 is to be retrieved. In some implementations, the query 180 can further include a vector embedding representing the semantic context of the current decision point and/or other additional context data of the AI agent 120 to facilitate semantic search operations within a vector database of the storage 115. For example, when an AI agent 120 encounters a previously unseen problem statement during task execution, the agent can generate a query 180 that specifies a textual keyword constraint and/or an embedding vector encoding the semantic features of the problem statement to locate experience data records 170 sharing similar contextual properties.

In some implementations, the query 180 can include executable or structured definitions to invoke one or more retrieval tool calls that access text, vector, or metadata databases concurrently. In some implementations, a query 180 can embed a function call that requests all data records 170 whose agent identifiers or tool usage metadata match a specified domain classification. In some implementations, the query 180 can specify a score-based filter such that experience data records 170 having a score exceeding a predefined reward threshold are retrieved/accessed. In one example, a query 180 generated by an AI agent 120 executing a physical control task can include a domain field identifying the control environment and/or a minimum score constraint to facilitate selection of high-fidelity prior actions 172.

The storage 115 can include one or more output actions 185 that represent executable operations generated by an AI agent 120 in response to its corresponding input context and any retrieved data records 170. Each output action 185 can specify one or more structured commands, instruction sequences, and/or other executable instructions that can carry out a decision/operation derived by the AI agent 120.

In some implementations, an output action 185 can include parameters and/or configuration values automatically determined based on past experience data records 170 retrieved as described in further detail herein, input data 118, and/or any other additional context data described herein. For example, an AI agent 120 generating an output action 185 may include a set of argument tokens and/or variable bindings that were inferred from previously executed actions 172 having similar contextual conditions in the data records 170 retrieved for the corresponding query 180. Each output action 185 can be stored in association with the corresponding query 180 that caused the AI agent 120 to obtain data records 170 to resolve a decision point. In some implementations, output actions 185 may be used to generate subsequent experience data structures 170 as described in further detail herein.

In some implementations, the output action 185 can represent one or more tool invocations that instructs another subsystem, component, and/or API to perform one or more processes specified by the AI agent 120. For example, the output action 185 can indicate a call to a computational tool, a control service, and/or a physical/simulated device to execute a particular operation or evaluation defined by the context of the AI agent 120. In some implementations, the output action 185 can specify multi-step instructions that include a sequence of function calls and/or parameterized tasks. Each output action 185 can be stored in association with its originating agent identifier and contextual inputs, in some implementations. In some implementations, each output action 185 can be stored in association with corresponding results of the action (e.g., results of executing the corresponding output action 185, etc.).

The data processing system 105 can store, maintain, or otherwise implement one or more reward models 160. The reward models 160 can generate reward scores associated with the actions 172 and/or output actions 185. The reward models 160 can include any type of model or process that can be used to evaluate different aspects of performance (e.g., degree to which an action 172 and/or output action 185 achieves a target objective associated with a decision point, etc.) across various operational domains. In some implementations, the primary categories can include human preference-based models, symbolic processor-based models, physical action-based models, exam-based models, and/or meta-agent based models. Each type of reward model 160 operate according to specific data inputs and computation operations for evaluating the effectiveness or correctness of an action 172 and/or output action 185 generated by an AI agent 120. In one example, a human preference-based reward model 160 may operate on subjective or qualitative human feedback. In another example, a symbolic processor-based reward model 160 may evaluate formal correctness of structured data such as code or mathematical derivations.

In some implementations, the human preference-based reward models 160 can include online optimization and retrospective optimization variants. The online optimization variant of the human preference-based reward models 160 can receive feedback from a human evaluator during or after action 172 and/or output action 185 generation (e.g., via binary selection, preference ranking, scaled scoring interfaces provided by the data processing system 105, etc.). The retrospective optimization variant of the human preference-based reward models 160 can apply delayed evaluation after observing longer-term results of prior actions 172 and/or output actions 185. Such output may include end-user ranking metrics provided after execution of multiple actions 172 and/or output actions 185.

The symbolic processor-based reward models 160 can include theorem processor and code interpreter variants. The theorem processor variant of the symbolic processor-based reward models 160 can include instructions to apply formal symbolic verification techniques to determine whether a generated logical or mathematical expression of the results of an action 172 and/or output action 185 satisfies a target condition (e.g., a target conditional statement, etc.). The code interpreter variant of the symbolic processor-based reward models 160 can include instructions to execute generated program code (e.g., produced via the actions 172 and/or output actions 185 or downstream operations associated therewith) within a controlled environment to determine whether the output matches expected results (e.g., a target objective) and/or passes defined test cases.

In some implementations, physical action-based reward models 160 can include robotic laboratory and robotic assembly line variants that operate within sensor-instrumented physical or simulated environments. The robotic laboratory variant of the physical action-based reward models 160 can include instructions to evaluate precision-based actions in physical experiments. To do so, results measured from physical or simulated outputs such as dosage accuracy or manipulation precision can be compared to target objective conditions, test conditions, and/or other evaluation criteria for experimental outcomes. For example, the robotic assembly line variant of the physical action-based reward models 160 can assess procedural correctness, timing efficiency, and/or throughput consistency during one or more task cycles resulting from actions 172 and/or output actions 185.

The exam-based rewards model 160 can compare generated results/outputs of actions 172 and/or output actions 185 against predetermined target data and/or structured evaluation keys associated with corresponding domains or tasks. Such approaches can be used to implement deterministic grading for actions 172 and/or output actions 185. The meta-agent based model can apply other AI agents 120 to score actions based on aggregate contextual evaluation, including but not limited to criteria such as rule adherence, goal alignment, and/or expected task progression metrics. Such reward AI agents 120 may be fine-tuned and/or updated according to the techniques described herein to improve their accuracy with respect to evaluation and scoring of actions 172 and/or output actions 185.

Each of the reward models 160 can produce a numerical score denoting how closely an observed outcome aligns with domain-specific success criteria within its respective evaluation context. In some implementations, the score can represent a quantitative measure indicating the extent to which an outcome generated by an action 172 and/or an output action 185 conforms to a target objective and/or satisfies one or more predefined success parameters. For example, the score generated by the reward models 160 can numerically quantify an accuracy ratio, completion level, and/or deviation metric identifying how nearly the measured result of an outcome matches an intended operational condition, performance benchmark, and/or modeled expectation associated with the corresponding action 172 and/or output action 185. In some implementations, the reward models 160 can assign higher scores to actions 172 or output actions 185 whose resulting outcomes meet or exceed a threshold alignment with a desired target condition defined for that evaluation context.

In some implementations, each reward model 160 can produce evaluation scores relevant to one or more task domain, and the aggregation of such scores can yield the respective score for an action 172 and/or output action 185. In some implementations, and as described in further detail herein, the score generator 140 can apply a domain weighting function that modifies the individual evaluation scores generated by each reward model 160 prior to computing the aggregate score for the corresponding action 172 and/or output action 185. For example, the score generator 140 can allocate higher weighting coefficients to symbolic processor-based reward models 160 in a code synthesis domain and lower weighting coefficients to human preference-based reward models 160 in that same domain. The weighting may be stored in configuration settings associated with a set of AI agents 120, a specific task, and/or a specific domain. In some implementations, the weighting function can be dynamically updated based on the frequency of action 172 success within the data records 170 stored in storage 115. For example, when repeated actions 172 in a physical simulation domain consistently exhibit high alignment with a physical action-based reward model 160, the weighting associated with that model may be increased proportionally for later scoring cycles. Each resulting aggregate score can therefore represent a normalized measure of domain-specific performance that facilitates comparison of actions 172 and/or output action 185 evaluated across various task domains.

Referring now to the operations of the data processing system 105, the data obtainer 135 can obtain a set of actions 172 generated by one or more AI agents 120 based on the input data 118. The actions 172 can be generated during execution of one or more tasks and/or operations implemented by the AI agents 120 operating within an environment and/or an application context. In some implementations, the actions 172 can be generated in response to processing the input data 118, such as data received from one or more sources operative within a domain or simulation. For example, the AI agents 120 can apply instructions encoded in model prompts to process the input data 118 representing sensor measurements, textual commands, or configuration states and generate corresponding actions 172 that specify computations, tool commands, or environment updates.

In some implementations, the actions 172 can be generated by the AI agents 120 in response to detecting decision points within the execution flow of their ongoing tasks or operations, where the decision points correspond to conditions indicating that a new output or tool invocation is required. In some implementations, a decision point can be detected based on a triggering condition associated with the state of a processing environment and/or the evaluation of internal context data (e.g., reasoning output, etc.). For example, the AI agents 120 can process intermediate output tokens and/or environmental metrics to identify state transitions that require generation of a new instruction and/or external command. In some implementations, command outputs specifying actions 172 can be performed via the reasoning and/or processing output of the AI agent 120 (e.g., according to how the AI agent 120 is trained, etc.).

In some implementations, the data obtainer 135 can access the actions 172 generated by the AI agents 120 through one or more programmatic interfaces executed within the data processing system 105. In some implementations, the generated actions 172 can be transmitted to the data processing system 105 via one or more API calls transmitted by the data obtainer 135 and/or the AI agents 120 at runtime. In some implementations, the data processing system 105 can detect instances of the actions 172 (e.g., tool calls) within the structured outputs generated by the AI agents 120 and extract corresponding data representations for processing. For example, when an AI agent 120 outputs a formatted instruction block that references a callable function or a system command, the data obtainer 135 can identify the action 172 within the output text, parse its parameters, and store it for subsequent scoring and processing operations described herein.

In some implementations, the data obtainer 135 can obtain data indicating the outcome 176 for each corresponding action 172 executed by one or more AI agents 120. The data obtainer 135 can identify the data sources or process outputs associated with the action 172 and retrieve measurable parameters representing the resulting effect of the action 172 within a simulated or operational environment. In some implementations, the data obtainer 135 can access a sensor feed, computation log, or environment output interface that generates numerical or textual data indicating a resultant state following execution of the action 172. For example, when the action 172 corresponds to a robotic movement, the data obtainer 135 can obtain positional and velocity measurements captured by embedded sensors to represent the resulting displacement, accuracy, and stability values of a robot controlled via the action 172. In another example, when the action 172 corresponds to an analytical evaluation, the data obtainer 135 can retrieve textual and/or structured response data output by the model to represent the corresponding outcome 176 for further scoring or storage. The data obtainer 135 can tag the obtained data with identifiers linking the outcome 176 to the action 172 and to its originating AI agent 120 to facilitate subsequent processing by the score generator 140 and data record manager 145.

The score generator 140 can generate, using one or more of the reward models 160, a respective score for each action 172. The respective score can represent a degree to which the action 172 satisfies a corresponding objective, as described herein. In one example, to generate the score, the score generator 140 can apply the reward models 160 by providing the action 172 and the outcome 176 corresponding thereto as output (e.g., via one or more client devices, display devices, etc.), and subsequently receiving evaluation data corresponding to the outcome 176 of the action 172 and executing one or more computational scoring functions over that data. In some implementations, the score generator 140 can execute any of the different types of reward models 160 (which may include AI agents 120, specific rule-based functions, etc.) as described herein to generate the scores for the actions 172.

In some implementations, the score generator 140 can retrieve configuration parameters that identify which reward models 160 to use according to a task domain and/or AI agent 120 identifier associated with the action 172. For example, for actions 172 associated with code validation, the score generator 140 can invoke a symbolic processor-based reward model 160 that measures logical correctness, whereas for actions 172 associated with physical control systems, the score generator 140 can select a physical action-based reward model 160 that computes precision errors and/or positional variances, among others. The score generator 140 can store the resulting numerical value of the score in association with the action 172 and/or outcome 176 to facilitate subsequent ranking and/or retrieval operations.

In some implementations, the score generator 140 can apply multiple reward models 160 to each action 172 to obtain multiple partial scores. As described herein, each reward model 160 can correspond to a respective evaluation criterion such as correctness, efficiency, human preference alignment, and/or completion accuracy, among any other type of score described herein. The score generator 140 can execute one or more selected (e.g., based on configuration settings, the specific task domain, the identifier of the AI agent 120, etc.) reward models 160 independently, generate a respective score using each model that is stored as a respective partial score, and can maintain an association between that partial score and the corresponding reward model 160 and action 172/outcome 176 for subsequent aggregation. For example, one of the reward models 160 can compute a binary correctness indicator and another can provide an averaged subjective preference rating based on human feedback inputs. In one example, the partial scores can be stored as a vector, with each coordinate of the vector storing one of the partial scores.

In some implementations, the score generator 140 can determine the respective score for an action 172 as a weighted combination of the partial scores. As described herein, the score generator 140 can obtain weighting coefficients from predefined configuration data associated with the techniques described herein. The score generator 140 can multiply each partial score by its weighting coefficient and sum the weighted scores to obtain an aggregate score. In some implementations, the score generator 140 can normalize the resulting sum within a bounded interval such as [0,1] to yield the respective score. In some implementations, weighting coefficients can be adaptive functions that may be modified and/or may change based on domain-specific performance metrics and/or reinforcement feedback received during successive evaluation operations, such as those described in connection with FIG. 3.

In some implementations, the score generator 140 can apply a decay function to the respective score of one or more previously stored experience data records 170 based on an age associated with the data record 170. The decay function can reduce the contribution of older data records during ranking and/or retrieval operations to prioritize selection of more recent experiential data records 170 in the storage 115. The score generator 140 can determine the age of the data record 170 by comparing a current timestamp to a timestamp value stored in metadata associated with the data record 170. In one example, the score generator 140 can apply an exponential decay function that including a decay rate parameter and time delta parameter representing the time since score assignment. In some implementations, the score generator 140 can select the decay rate parameter and time delta from configuration settings associated with the respective domain of the actions 172 and/or AI agents 120.

The data record manager 145 can generate, for each action 172, a respective data record 170. In some implementations, the data record manager 145 can combine the action 172 with corresponding input 174, outcome 176, and a score value received from the score generator 140 to form a unified data structure representing one operational instance of the AI agent 120. The input 174 can represent the contextual data that led to the generation of the corresponding action 172, and may include the environmental state, sensor readings, task parameters, and/or any other context tokens processed by the AI agent 120 prior to generation and execution of the action 172. For example, the input 174 can include a vector-encoded query, a simulation parameter set, and/or a pre-processed data sequence that defined the decision conditions under which the AI agent 120 produced the action 172.

The data record manager 145 can allocate one or more memory buffers to temporarily store individual elements of the data record 170 before committing them to the repository (e.g., the storage 115). For example, the data record manager 145 can maintain an index-to-field mapping structure where each stored action 172 is referenced alongside a unique record identifier that links to the corresponding input 174, outcome 176, and metadata. In some implementations, the data record manager 145 can initiate data serialization operations that convert structured memory representations into text-encoded or binary-encoded data formats that are compatible with the underlying database schema of storage 115.

The data record manager 145 can store each generated data record 170 within storage 115, which as described herein can be a repository accessible to the AI agents 120. In some implementations, the data record manager 145 can store metadata in association with each data record 170. The metadata can include at least one of a domain identifier, an agent identifier, a timestamp, and/or an access-level tag. The data record manager 145 can allocate entries in one or more index tables of the storage 115 that reference the respective data record 170 by its unique identifier and associated metadata. In some implementations, the data record manager 145 can arrange the storage in domain-partitioned tables and/or collections/groups to allow concurrent read and/or write operations across multiple AI agents 120.

In some implementations, the data record manager 145 can generate a vector representation of the data representative of the action 172, the input 174, the outcome 176, and the respective score associated with the data record 170. In some implementations, the data record manager 145 can store the generated vector representation in a vector database of the storage 115. The data record manager 145 can transmit the structured text representation of the data record 170 to an embedding model that computes the corresponding vector encoding, which may capture semantic relationships among textual and numerical components. For example, the data record manager 145 can provide concatenated field values from the action 172, input 174, and outcome 176 to the embedding model to derive an N-dimensional vector output. The data record manager 145 can assign this vector to a vector index in storage 115 in association with the metadata of the data record 170 to facilitate combined text-based and vector-based retrieval as described in further detail herein (e.g., in connection with FIG. 4).

The data processing system 105 can coordinate execution of self-play sessions, episodic replay operations, and environment simulations to generate additional data records 170 during a training phase. In some implementations, the data processing system 105 can schedule or trigger multiple AI agents 120 to operate in simulated conditions where each AI agent 120 generates actions 172, outcomes 176, and corresponding reward scores, which the data record manager 145 can store as new data records 170. For example, the data processing system 105 can instruct the AI agents 120 to perform cooperative and adversarial task variations under controlled simulation parameters to expand the diversity of experiential outcomes 176 stored in the storage 115. In some implementations, the data processing system 105 can replay previously stored data records 170 and vary environmental parameters to produce alternative trajectories that enrich the experience dataset available for later retrieval and fine-tuning processes. Further details of the training phase are described in connection with FIG. 2.

Referring now to FIG. 2, illustrated is a flow diagram 200 of an example process for generating and storing experience data records (e.g., data records 170, etc.) during a training phase for a shared experience repository (e.g., the storage 115). The process shown in the diagram 200 may be implemented, for example, using any of the components described in connection with FIG. 1, including but not limited to the AI agents 120A-120N, the data processing system 105, and/or any of the components thereof.

The diagram 200 shows the process 202 of using the AI agents 120 to interact with an environment as part of a training phase. The training phase can involve executing the AI agents 120 in simulated and/or controlled physical environments to expose the AI agents 120 to a variety of experiences (e.g., actions 172, input 174, outcomes 176, etc.). The environment can include controlled simulated environments, physical test spaces, and/or digital twin systems that replicate real-world operational states. The training phase may be initiated, for example, in response to operator input at the data processing system, based on one or more predetermined schedules, and/or in response to one or more requests from external computing systems.

In some implementations, the AI agents 120 can be executed to engage in "self-play" conditions in which an AI agent 120 executes competing and/or complementary tasks against cloned instances or other AI agents 120 within the simulated/controlled environment to generate diverse experience data. For example, an AI agent 120 acting as a manufacturing planner can execute instructions to generate/optimize production sequences, while a cloned agent can attempt to identify constraint failures under varying parameter conditions. The interactions can be mediated by predefined simulation parameters, such as environmental variables, timing intervals, or stochastic variations, which may be specified via operator input, configuration settings, and/or specified in one or more requests.

The AI agents 120 can interact with the environment by receiving state variables and/or context parameters representing current environmental conditions and processing those inputs according to respective system prompts or task instructions to identify subsequent decision points. In some implementations, the input data can include environmental variables, sensor measurements, and/or simulated parameters such as velocity, position, temperature, or any other possible simulated characteristic or parameter. The input data can be pre-processed into tokenized or vectorized representations compatible with the input formats of the AI agents 120.

In some implementations, each AI agent 120 can execute an internal reasoning stage (e.g., autoregressively, according to their training), and using the received environmental inputs against to determine what output is to be generated to achieve one or more goal conditions defined in its prompt and/or input instructions for the simulation/training phase configuration/task. In some implementations, the AI agent 120 can identify a decision point that requires generation of an output or control instruction (e.g., an action 172), as described in further detail in connection with process 204. The process 202 can execute concurrently with other processes shown in the diagram 200, such that the AI agents 120 can continuously process and execute actions to interact with the training phase environment.

In some implementations, the environment used for process 202 can include digital twins that synchronize with operational data sources to replicate dynamic systems in real time or near real time. For example, a digital twin of an industrial process can provide a live stream (or a historical stream) of sensor values representing temperature, torque, or voltage, allowing an AI agent 120 to issue predictive control actions 172 and compare simulated results to physical measurements. The AI agents 120 can conduct episodic replay operations by retrieving previously recorded input data 118 and generating outputs (e.g., as described in connection with process 204) with parameter modifications (e.g., as specified in training phase configuration data, etc.) to measure alternative outcomes. In one example, the replay operations can be scheduled as part of periodic learning cycles, where the agents 120 can be executed to identify improved decisions through variation of previously executed scenarios in either simulated or physical environments.

The diagram 200 shows the process 204, in which the AI agents 120 can generate action paths (e.g., actions 172) according to the data obtained in the process 202. The action paths can include one or more structured sequences of commands and/or tool invocations that define the decision-making trajectory undertaken by an AI agent 120 during a task (e.g., an interaction via process 202). In one example, the AI agents 120 can generate an action path by incrementally evaluating each observation of environmental state data obtained in process 202, determining a corresponding next step using internal reasoning outputs, and generating an output operation as an action. For example, in a simulated robotic assembly task, the AI agent 120 can evaluate positional offsets and successively compute actuator adjustments that minimize alignment error while maintaining force thresholds within set parameters. In some implementations, each branching decision in the action path can be assigned metadata specifying the environmental condition, timestamp, or contextual parameter set under which it was generated, allowing reconstruction of each full sequence for analysis or replay during subsequent training sessions.

The diagram 200 shows the process 206, in which a data processing system (e.g., the data processing system 105) can execute one or more reward models (e.g., reward models 160) to generate scores for the action paths of process 204 based on their corresponding outcomes. The data processing system 105 can select appropriate reward models 160 based on domain identifiers associated with each set of actions and detected outcomes. Outcomes can be detected via process 202, in which input information is obtained from the simulated/physical environment in response to executed action paths generated at process 204. Each reward model can receive as input numeric measurements, symbolic verification outputs, and/or feedback signals representing the results of executed actions of the action paths generated via process 204. Any of the operations described in connection with the score generator 140 and/or the reward models 160 of FIG. 1 can be performed to generate one or more scores for the action paths generated via the process 204.

The diagram 200 shows the process 208, in which the data processing system can generate one or more experience data records (e.g., data records 170) including the scores and actions. The data processing system can combine each set of actions generated via process 204, their corresponding inputs generated via process 202, the resultant outcomes detected via process 202, and the generated scores generated via process 206 into a structured representation that defines one experience instance (e.g., a data record 170). In some implementations, the data record manager 145 can append metadata describing contextual information such as agent identifiers, domain classifications, and timestamps to facilitate subsequent filtering. For example, in a simulation producing multiple decision trajectories, each experience data record can indicate which AI agent 120 generated the corresponding actions and which environmental condition sets led to the detected outcomes.

The diagram 200 shows the process 210, in which the data processing system can store the generated data records in a shared repository (e.g., the storage 115). In some implementations, and as described in further detail in connection with FIG. 4, the storage 115 can include text-based indices for deterministic search operations, vector databases for semantic retrieval, and/or metadata indices for domain and/or agent-specific filtering. In some implementations, the data processing system can allocate partitioned storage regions based on domain or agent identifiers to facilitate concurrent read and write access by multiple AI agents 120. The data processing system can store each experience data record generated via the process 208 following its creation, such that the experience data record may be retrieved via subsequent queries for evaluation (e.g., using evaluation processes described in connection with FIG. 3).

Referring back to FIG. 1, the data processing system 105 can use the generated/derived data records 170 to inform the generation of subsequent output actions 185 during execution of the AI agents 120. In some implementations, the AI agents 120 can be executed in real-world operational environments, simulated environments, and/or distributed computing environments in which context data for each AI agent 120 can be dynamically updated during operation. For example, an AI agent 120 operating in a robotics environment can process state data to determine a new decision condition for the selection of a type of trajectories, which may be informed by prior trajectories specified in previously stored experience data records 170. Upon detecting such a decision point within a reasoning output, the AI agent 120 can generate and transmit a retrieval query 180 to obtain one or more data records 170 representing relevant prior experiences for incorporation into its current input context.

For example, the model executor 150 can generate, using one of the AI agents 120, a query 180 for at least one data record 170 stored in storage 115. The query 180 can be generated according to an input context of the AI agent 120. In some implementations, the model executor 150 can compose the query 180 by encoding attribute values derived from the AI agent 120 output, which may include symbolic tokens extracted from a function call provide din reasoning chain. Such tokens may represent data including but not limited to, a goal descriptor, an issue and/or decision type, and/or any other data that may be encoded in an experience data record 170. The model executor 150 can generate a textual query including text data derived from the token outputs of the AI agent 120 representing the decision point and any parameters thereof.

The model executor 150 can select a first data record 170 from storage 115 based at least on a similarity between the query 180 and the first data record 170 and the respective score of the first data record 170. In some implementations, the model executor 150 can retrieve candidate data records 170 that satisfy predefined matching criteria determined by a combination of lexical overlap. Any suitable matching technique may be used, including but not limited to string search, inverted index search, term frequency-inverse document frequency (TF-IDF), and/or BM25, among others. In some implementations, the model executor 150 can apply a reward-based weighting factor to each data record 170 so that higher-scoring data records 170 are preferentially selected for incorporation into the AI agent 120 context. In some implementations, thresholds for similarity or score weighting can be domain-specific and can be defined in configuration data associated with the operational mode of the AI agent 120.

In some implementations, the model executor 150 can select the first data record 170 of storage 115 further based on an agent identifier of the first data record 170 and an identifier of the AI agent 120 that provided the query 180. The model executor 150 can parse metadata of each candidate data record 170 to extract its agent identifier and perform an equality comparison match against the requesting AI agent's identifier. For example, when the originating AI agent 120 has an operational identifier "analysis-domain-07," the model executor 150 can constrain retrieval to data records that originated from agents having the same or related identifier range. In some implementations, when multiple agent identifiers match a broader functional category, the model executor 150 can expand the search to include that category to improve experience transfer across related AI agent 120 types. In some implementations, filtering can be performed such that the text-based matching of data records 170 is performed only over a subset of data records 170 that identify the same task domain and/or agent identifier as the AI agent 120 that provided the query 180.

In some implementations, the model executor 150 can perform a vector search operation over the vector database to identify the first data record 170. To do so, the model executor 150 can query a vector index of the storage 115 that maintains numerical representations of the stored data records 170 and compute nearest-neighbor matches based on predefined distance metrics. For example, the model executor 150 can invoke a similarity computation such as Euclidean distance and/or cosine similarity, among others, over embedding vectors and return the top-ranked record satisfying a combined threshold of proximity and score. In some implementations, the model executor 150 can select a retrieval depth and/or number of nearest neighbors from configuration settings of the AI agents 120 and/or the specific task domain corresponding to the AI agent 120 that provided the query 180.

In some implementations, the model executor 150 can operate in a hybrid retrieval mode that combines vector search operations with text-based search operations to identify data records 170 having the greatest contextual relevance. In such implementations, the model executor 150 can execute a text query over a text index of the storage 115 to identify candidate data records 170 matching lexical tokens of the query 180, and can perform a vector similarity retrieval to identify data records 170 having high (e.g., greater than a threshold, top-K, etc.) embedding proximity to the query vector. For example, the model executor 150 can perform a Boolean aggregation that intersects top-ranked lexical results with top-ranked semantic results. In another example, the model executor 150 can apply a weighted fusion function that computes a composite ranking score for each candidate data record 170 based on both lexical relevance and vector distance metrics. In some implementations, parameter weights specifying the relative influence of vector similarity and textual overlap can be selected based on stored configuration values corresponding to task domain and/or agent identifier of the AI agent 120 corresponding to the query 180.

In some implementations, the model executor 150 can identify a subset of the data records 170 in storage 115 based on the respective scores of such data records 170 and select the first data record 170 from that subset based on similarity to the query 180. The model executor 150 can calculate ranking positions for each data record 170 by applying a sorting operation over numerical score values stored in association with corresponding metadata. In some implementations, the model executor 150 can apply a cutoff threshold representing a minimum score value by excluding any data records 170 whose scores fall below that threshold prior to performing further similarity assessments. For example, the model executor 150 can execute an n-best ranking process that extracts the top N data records 170 by descending score order and use those selected records to compute pairwise similarity values with the embedding vector and/or lexical tokens of the query 180. The model executor 150 can select the first data record 170 that achieves the combined maximal relevance derived from both score magnitude and computed similarity distance. In some implementations, the model executor 150 can select a predetermined number of top-ranking data records 170 using the techniques described herein, where the number may be specified in configuration settings of the task domain, the AI agent 120, and/or the data processing system 105.

Once the relevant data records 170 (e.g., the selected first data record 170) are identified and retrieved, the model executor 150 can combine the input context with data of the first data record 170 to generate an augmented input context and can provide the augmented input context to the AI agent 120 as input for subsequent execution. To do so, the model executor 150 can merge contextual tokens derived from the AI agent 120 input context with structured fields of the first data record 170, such as text, vector, and metadata entries, by aligning their respective embedding dimensions in a concatenated vector space. In some implementations, the model executor 150 can tokenize one or more portions of the data from the first data record 170 to match the tokenization scheme used by the AI agent 120 before concatenating the augmented context representation. In some implementations, metadata and/or control tokens may be provided that specify what portion of the input context corresponds to the retrieved experience data record(s) 170. The augmented input context generated by the model executor 150 can be provided as a string, a tensor, or any other suitable data structure to the AI agent 120 for processing in subsequent reasoning/inference operations.

The model executor 150 can execute the AI agent 120 using the relevant data records 170 (e.g., the selected first data record 170) to generate an output action 185 corresponding to the input context. The model executor 150 can provide the augmented input context to the AI agent 120 as serialized token sequences for autoregressive processing within a context window. In some implementations, autoregressive generation can cause the AI agent 120 to sequentially generate tokens that incrementally finalize a coherent response based on contextual dependencies identified within prior tokens of the same sequence. The generated tokens can collectively represent a structured output, generated based on the augmented input context including the data of the selected data records 170, that specifies one or more parameters, function calls, and/or tool invocation commands (e.g., output actions 185) determined based on the retrieved data record 170 and the input context. For example, the generated response can encode an output action 185 including an instruction such as an analytical computation call, an environment modification instruction, and/or a data transmission request, among others. In some implementations, the AI agent 120 can execute multiple output actions 185.

The model executor 150 can execute the output action 185 generated by an AI agent 120 according to the augmented input context. The model executor 150 can identify the execution type of the output action 185 based on a command schema that specifies whether the output action 185 represents a tool invocation, a function call, and/or a parameter assignment in an external computing system, among other possible output actions 185. In some implementations, the model executor 150 can transmit the structured parameters contained in the output action 185 to one or more connected computational services and/or device interfaces for execution. For example, the model executor 150 can execute an output action 185 that instructs a robot and/or robotic simulation process to modify actuator torque values or control signal timing within a defined task cycle. In some implementations, the model executor 150 can coordinate sequential or parallel execution of multiple output actions 185 generated via output by distributing command execution requests among available processing threads, hardware endpoints, or service interfaces. For example, when multiple output actions 185 specify evaluation of independent functions, the model executor 150 can issue concurrent requests through an asynchronous execution queue to reduce total latency.

The model executor 150 can obtain resulting data from executed output actions 185 such as return values, computation results, and/or environmental state updates, and can use those results to determine one or more outcomes 176 corresponding to the output actions 185. In some implementations, the model executor 150 can retrieve the resulting data directly from process interfaces and/or device endpoints associated with the executed output actions 185 and can parse the returned data to identify numerical, textual, or state-based indicators representing measurable changes within a corresponding environment. For example, when an AI agent 120 executes an output action 185 comprising a computational function call, the model executor 150 can read one or more values generated in response to that function call and classify those values as outcome metrics for that operation. In another example, when the executed output action 185 corresponds to a tool invocation that controls a physical or simulated device/system, the model executor 150 can receive telemetry and/or environment readings indicating position, temperature, and/or any other physical parameters that result from execution of the output action(s) 185. The model executor 150 can correlate each piece of received data with its originating output action 185 and can construct an outcome 176 data structure.

In some implementations, the data record manager 145 can update the storage 115 to include an additional data record 170 based on an outcome 176 resulting from an output action 185 generated by an AI agent 120. The data record manager 145 can obtain identifiers corresponding to the output action 185 and the resulting outcome 176, combine the data with metadata indicating the originating AI agent 120, and generate a data record 170 instance for insertion into the storage 115 that represents the experience encompassing the input context, the corresponding output actions 185, and resulting outcomes. In some implementations, the data record manager 145 can serialize the input context as the input 174, the output action 185 as the action 172, and the detected outcome of the output action 185 as the outcome 176, into a text representation. An example overview of a process for generating, storing, and generating data records 170 are described in connection with FIG. 4.

In some implementations, concurrent with or following the training phase, the model executor 150 can execute a test phase to evaluate the performance of data records 170 maintained in the storage 115. The model executor 150 can retrieve one or more of the data records 170, execute corresponding actions 172 under controlled or simulated conditions, and compute evaluation metrics based on the observed outcomes 176 to assess consistency and scoring accuracy. In some implementations, additional retrospective scoring can be performed to re-evaluate one or more data records. Further details of the test phase are described in connection with FIG. 4.

Referring now to FIG. 3, illustrated is a diagram 300 of an example process for testing and evaluating experiences stored in a shared experience repository. The process shown in the diagram 300 may be implemented, for example, using one or more of the components described in connection with FIG. 1, including but not limited to the AI 120A-120N, the data processing system 105, and/or any of the components thereof. The diagram 300 illustrates a sequence of operations through which an AI agent (e.g., an AI agent 120) can evaluate stored experience data records (e.g., data records 170) and generate an updated representation of performance outcomes (e.g., updated scores). In some implementations, the process shown in the diagram 300 can be performed, for example, following or concurrent with the training phase process described in connection with FIG. 2.

The diagram 300 includes process 302, in which an AI agent can detect a decision point during processing of a simulated or physical environment. In one example process shown in the diagram 300 may be executed while the AI agent interacts with an environment and/or performs testing of one or more self-play and/or replay operations. The detection of the decision point can occur when the AI agent processes contextual inputs and/or intermediate reasoning outputs that indicate a new operational branch and/or a pending action. In some implementations, a decision point is identified when a predefined threshold of environmental change, such as a deviation in sensor data or simulated state conditions, triggers an internal evaluation routine. For example, the AI agent can process input tokens representing temperature fluctuation, velocity changes, or symbolic task progression data and determine that the current conditions require selection of a next step or function call. The AI agent can use internal or external indicators such as control parameters, evaluation flags, and/or timing intervals to determine that the current reasoning sequence corresponds to a decision point requiring retrieval of prior experiences from the shared store.

The diagram 300 includes process 304, in which an AI agent can generate one or more queries (e.g., queries 180) to retrieve data records corresponding to the decision point. The query can be generated by encoding the task context and/or domain information associated with the decision point into a structured representation for execution against the shared experience repository (e.g., the storage 115). In some implementations, the generated query can include a textual clause, a vector embedding derived from the semantic meaning of the decision point, and one or more metadata filters restricting the search space by agent type, task domain, or reward score ranges. The query can then be provided to and/or otherwise used in connection with the repository interface to locate matching data records whose contextual similarity aligns with the decision point currently under evaluation.

The diagram 300 includes process 306, in which a data processing system (e.g., the data processing system 105) can select a relevant data record (e.g., data record 170). To do so, any of the operations of the data record manager 145 and/or the model executor 150 of FIG. 1 can be performed. In one example, the selection can be based on a composite similarity incorporating similarity between the query and stored data, along with the respective reward score of each record. In some implementations, the system can perform a vector similarity search to identify the top-K data records by semantic closeness and/or execute text-based searching functions, and rank the combined results, as described in connection with FIG. 1. The resulting ranked data record (or set of data records) can be selected for further processing, as described herein.

The diagram 300 includes process 308, in which the data processing system can execute an action based on the selected data record. The selected record can include an encoded instruction or tool invocation sequence representing the operation previously executed by an AI agent under similar conditions. In some implementations, the data processing system provides the selected data record as part of the input context for execution by the AI agent, thereby such that the AI agent incorporates the retrieved experiential data into its reasoning process. To do so, any of the operations of the model executor 150 of FIG. 1 can be performed. The AI agent can process the augmented input context to determine one or more actions (e.g., output actions 185) based on the data records selected in the process 306. The data processing system can execute the actions to affect the simulated and/or physical environment with which the AI agent is interacting.

The diagram 300 includes process 310, in which the data processing system can generate an outcome. The generated outcome can correspond to measured and/or computed results following execution of the selected action within the operational or simulated environment via the process 308. In some implementations, outcome data can include sensor readings, simulation logs, and/or return values representing the state of one or more system variables post action execution, as described herein. The data processing system can process such outputs and associate them with the original input context and executed action (e.g., an experience) to generate one or more data records representing the experience.

The diagram 300 includes process 312 in which the data processing system can generate an additional data record with an updated score. For example, the data processing system can generate one or more retroactive scores. In some implementations, the score update can be performed by re-evaluating the newly generated outcome using one or more reward models (e.g., the reward models 160) that analyze the relationship between achieved and target conditions. To do so, any of the operations of the score generator 140 of FIG. 1 can be performed. In some implementations, the data processing system can assign an updated score reflecting the revised performance evaluation and embed it as part of an additional data record associated with one or more of the data records selected via the process 306. For example, a retrospective scoring process can compare long-term metrics such as stability or accuracy over multiple time steps and/or execution events, and can increase or decrease the assigned reward score of any related data records accordingly. Retroactive scoring can be performed using similar techniques to those described in connection with FIG. 1, except using additional and/or alternative target objectives (e.g., representing long-term metrics associated with the respective task domain, etc.). The process shown in the diagram 300 can be repeated to evaluate and/or retroactively re-score any number of data records in the repository.

Referring now to FIG. 4, illustrated is a diagram 400 of an example process for storing and accessing experience data from a shared experience repository in a multi-agent artificial intelligence system. The process shown in the diagram 400 may be implemented, for example, using one or more of the components described in connection with FIG. 1, including but not limited to a data processing system 105 and one or more AI agents 120. The operations shown in the diagram 400 represent sequential and/or parallel actions that can be executed to manage conversion, indexing, and retrieval of experience data records (e.g., data records 170) stored in the shared repository (e.g., storage 115).

The diagram 400 includes the process 402, in which a data processing system (e.g., the data processing system 105) can obtain a data record (e.g., a data record 170 representing an experience that is to be stored in the shared repository). The data record can be retrieved from temporary memory regions and/or via any of the techniques described herein to generate one or more data records that AI agent experiences. To do so, any of the operations of the data record manager 145 of FIG. 1 can be performed. For example, following the execution of one or more actions (e.g., actions 172) the data processing system can generate a data record including the corresponding input context (e.g., input 174, agent state information, etc.), the actions, one or more outcomes (e.g., outcomes 176, etc.) that is to be stored in the shared repository.

The diagram 400 includes the process 404, in which the data processing system can convert the data record into a text representation and a vector representation. The conversion process can include serializing structured data fields of the data record obtained in process 402 into a deterministic text format suitable for storage in a text database. In some implementations, the data processing system can execute a language embedding model to generate the vector representation of the same data record by transforming its text form into a multidimensional numerical vector describing semantic relationships between the stored tokens. For example, the data processing system 105 can concatenate field values associated with an input context, action commands, and observed outcomes and provide the concatenated text to an embedding model that is trained to generate a vector for similarity computation.

The diagram 400 includes the process 406, in which the data processing system 105 can extract metadata from the data record. In some implementations, metadata extraction can occur by accessing various data of the data record to identify values corresponding to one or more predetermined parameters such as agent identifiers, task domains, time-stamps, and/or reward scores. For example, the data processing system 105 can parse record fields or other data structure regions to identify the predetermined parameters.

Following operations of processes 404-406, the data processing system can store the generated representations of the data record into the shared repository for later retrieval. The text representation of the data record can be stored in a text database 408 of the shared repository described herein (e.g., the storage 115). The vector representation of the data record can be stored in a vector database 410 of the shared repository described herein (e.g., the storage 115). The metadata can be stored in a metadata database 412 of the shared repository described herein (e.g., the storage 115). Any of the operations of the data record manager 145 of FIG. 1 can be performed to store the data record in the shared repository, including operations relating to storage of metadata, storing the text data in the text database 408, and storing the vector representation of the data record in the vector database 410.

The diagram 400 includes the process 414, in which the data processing system can receive a query (e.g., the query 180). The query can be generated by an AI agent operating during an inference stage and can include parameters derived from an active task context. In some implementations, the AI agent can encode its reasoning state (e.g., the input context including/representing the agent state), any specific goals and/or decision point parameters (e.g., expected and/or target objective, etc.) that may be represented in the context of the AI agent into a structured representation. In some implementations, the data processing system can generate one or more vector representations (e.g., using an embedding model) to generate a vector query in addition to a text-based query using the context information of the AI agent. The data processing system can receive the query and/or a request to generate a query via one or more tool/function calls invoked via one or more AI agents. In some implementations, the data processing system can receive the request via one or more APIs corresponding to the shared repository (e.g., searching APIs for the storage 115, etc.). In some implementations, additional query parameters can be included in the query that define constraints such as minimum score values, agent identifiers, and/or domain identifiers, as described in connection with FIG. 1.

The diagram 400 includes the process 416, in which the data processing system can execute a search for one or more relevant data records in the shared repository using the query. This can include performing a vector search over the vector database 410 and a text search over the text database 408 to identify one or more data records that closely correspond to the query. In some implementations, the data processing system can perform text retrieval by matching explicit token sequences to text entries in the text database using search algorithms such as inverted indexing and/or term weighting, as described herein. In some implementations, the system can generate an embedding vector from the query and compute similarity scores against the stored vector representations of prior experience data in the vector database 410.

The diagram 400 includes the process 418, in which the data processing system can aggregate the search results for the query. The data processing system can merge independent result sets obtained from the vector and text searches into a data structure that stores record identifiers and associated metadata. In some implementations, the system can eliminate duplicate records appearing across multiple indices by analyzing metadata keys and computing intersection sets according to record identifiers. For example, when both vector and text searches retrieve overlapping experiences, the system can retain the highest-ranked instance while maintaining linkage to all corresponding vector indices. In some implementations, additional constraints such as reward score boundaries, domain tags, and/or time range constraints, among others can be applied to narrow the merged candidate list of data records.

The diagram 400 includes the process 420, in which the data processing system can include filter and ranking selected data records according to context. To do so, any of the operations of the data record manager 145 and/or the model executor 150 of FIG. 1 can be performed. For example, the data processing system can execute a ranking algorithm that determines priority values for each candidate data record, which may operate as a function of similarity metrics, metadata attributes, and/or reward scores. In some implementations, weighting coefficients can be assigned to each criterion so that contextual similarity and/or scoring significance can influence the ranking differently depending on the operational domain of the AI agent. The ranking process can generate a positional order where the most contextually aligned and highest-scoring data records are placed first. In some implementations, a predetermined number of top-ranking data records can be selected for inclusion in the input context of the AI agent in the process 422.

The diagram 400 includes the process 422, in which the data processing system can provide the ranked results to the AI agent. The data processing system can provide ranked list of data records to the requesting AI agent, which can include incorporating the identified experience data records into its inference context. To do so, any of the operations model executor 150 of FIG. 1 can be performed. As described herein, the AI agent can use the received records with its current task context to refine its next set of reasoning tokens and/or control decisions. Doing so can facilitate the generation of more accurate and more informed processing operations (e.g., output actions 185) generated via the AI agent.

Referring back to FIG. 1, the model executor 150 can perform one or more self-improvement operations to update one or more of the AI agents 120 and/or reward models 160 (e.g., agent-based reward models, etc.) according to the data records 170 representing various experiences. In some implementations, the self-improvement operations can include scheduled tasks that initiate autonomous optimization (e.g., training, fine-tuning, etc.) operations executed outside normal inference or production cycles. For example, the data processing system 105 can execute scheduled jobs that periodically initiate self-play sessions and/or episodic replay cycles to extend the range of stored experience data records 170, as described in connection with FIG. 2. Such data records 170 may be evaluated and updated according to the techniques described in connection with FIG. 3.

In some implementations, the model executor 150 can apply fine-tuning processes for the AI agents 120. Such fine-tuning operations may include fine-tuning of the AI agents 120 full-parameter fine-tuning operations, and/or adapter-based fine-tuning operations. The adaptor-based fine-tuning processes can permit partial skill refinement and parameter updating without performing a full retraining cycle. For example, an adaptor layer can be instantiated with a predetermined number (e.g., specified in configuration data of AI agent 120, etc.) of learnable parameters that capture incremental performance improvements based on updated data records 170 and/or reward model 160 outputs. The adaptor layer can be trained or recalibrated during scheduled learning sessions to incorporate new knowledge, align to new domain contexts and/or data records 170, and/or re-weight reward criteria in response to environmental changes. The data generated during adaptor fine-tuning operations can be recorded as additional data records 170 for future retrieval and comparison. Further details of example self-improvement operations are described in connection with FIG. 5.

Referring now to FIG. 5, illustrated is a diagram 500 of an example process for implementing self-improvement using data in a shared experience repository in a multi-agent artificial intelligence system. The process shown in the diagram 500 may be implemented, for example, using any of the components described in connection with FIG. 1, including but not limited to the data processing system 105, the AI agents 120A-120N, and/or any of the components thereof. The diagram 500 depicts a sequence of operations that enable autonomous optimization of agent behavior through simulation and evaluation cycles.

The diagram 500 can include the process 502, in which a data processing system (e.g., the data processing system 105) can simulate/control an environment and context for one or more AI agents (e.g., AI agents 120) to implement self-play and/or replay operations. In some implementations, the data processing system can instantiate simultaneous virtual environments where a first AI agent performs designated actions while a secondary AI agent responds with counter actions generated under varied context conditions. For example, the data processing system can initialize simulation parameters that define environmental attributes such as input variable ranges, temporal constraints, and performance metrics, which each AI agent can use to determine optimal or exploratory action policies. To implement these techniques, any of the operations of the training phase process described in connection with FIG. 2 can be performed. For instance, the process 502 can include performing one or more of the operations of the process 202 of FIG. 2 to facilitate interaction between the AI agents and a simulated/controlled environment.

The diagram 500 can include the process 504, in which the data processing system can generate one or more experience data records (e.g., data records 170, etc.). To do so, any of the operations of the training phase described in connection with FIG. 2 can be performed. In doing so, the data processing system may execute any of the operations described in connection with the processes 204-208 of the diagram 200 of FIG. 2. For example, the data processing system can generate the data records by combining the input context of each AI agent, any specific actions (e.g., actions 172) generated by that agent, and any measured or simulated outcomes (e.g., outcomes 176) derived from executing the action within the simulated/controlled environment. Each experience data record can be generated to include an embedded timestamp, domain identifier, an agent identifier, and any other metadata described herein. In performing the operations of the process 504, any of the operations of the data record manager 145 of FIG. 1 can be performed.

In generating the experience data records, the data processing system can execute one or more reward models (e.g., reward models 160) to generate corresponding reward scores indicating an immediate reward based on one or more outcomes measured from the experience data record. To do so, any of the operations of the score generator 140 can be performed. In some implementations, and as described in connection with FIG. 1, the data processing system can compute composite reward scores by combining multiple reward functions weighted according to predetermined coefficients (e.g., corresponding to the task domain, etc.). In some implementations, each computed reward value can be normalized to a bounded range. The computed scores can be included in their corresponding experience data records.

The diagram 500 can include the process 506, in which the data processing system can store the data records encoding experiences generated via the process 504 in a shared repository (e.g., the storage 115). To do so, any of the operations of the data record manager 145 and/or the process described in connection with FIG. 4 can be performed. For example, the data processing system can transform each experience representation into text and vector formats prior to storage, such that a hybrid text-vector search process can be used to identify relevant data records during later retrieval operations. The data processing system can maintain a metadata index that maps each experience data record identifier to a corresponding timestamp, domain classification, agent identifier, and reward score, as described herein.

The diagram 500 can include the process 508, in which the data processing system can perform testing operations. Non-limiting example operations of testing operations for the data records can involve performing any of the operations of the testing phase described in connection with FIG. 3 using operational data corresponding to the data records generated and stored via the processes 504-506. In some implementations, the data processing system can instantiate stored experience conditions to assess whether AI agents reproduce consistent decision outcomes given equivalent state transitions. For example, the data processing system can retrieve an experience data record from the shared repository having a specific input configuration and instruct an AI agent to re-execute the associated action to measure deviation in outcome or reward accuracy. In some implementations, the testing operations may be performed in connection with the self-play and/or replay operations executed as part of the process 502.

The diagram 500 can include the process 510, in which the data processing system can execute retrospective scoring for the data records according to the testing operations performed via the process 508. Non-limiting example operations of testing operations for the data records can involve performing any of the operations of the testing phase described in connection with FIG. 3 using operational data corresponding to the data records generated and stored via the processes 308-312. Additionally or alternatively, any of the operations described in connection with the data structure manager 145 and/or the score generator 140 of FIG. 1 can be performed. The retrospective scoring process can include adjusting or replacing previously assigned reward values according to newly observed long-term outcome metrics or updated evaluation criteria.

For example, when time-dependent effects influence measured performance results (e.g., longer term outcomes 176, etc.), the data processing system can derive adjusted reward scores by integrating cumulative outcome measures collected over an extended simulation horizon. Furthering this example, the data processing system can perform operations of the process 510 by accumulating successive output measurements related to prior actions across discrete simulation intervals and/or time periods and combining their values to compute a cumulative performance metric. For example, each action (e.g., outcome 176 corresponding to an action 172) scored across the simulation period can contribute a weighted term to a cumulative function that reflects the magnitude and persistence of performance changes over time. The aggregated metric can then be processed through a normalization function and/or a decay-based aggregation (e.g., a weighted moving average, etc.) to produce an updated reward score that more accurately represents longitudinal performance. The data processing system can update each of the re-scored data records in the repository, as shown. In some implementations, each re-scored data record can replace its prior reward metric. In some implementations, the re-scored data records can be stored as corresponding additional versions, for example, by appending a version identifier indicating the scoring iteration under which the reward adjustment was performed.

The diagram 500 can include the process 512, in which the data processing system can execute one or more fine-tuning operations for one or more AI agents implementing the self-play and/or replay operations via the process 502. Fine-tuning can occur after the corresponding experience data records generated in previous processes have been evaluated and re-scored, such that validated and score experience data records are used as training input. The data processing system can select data records containing text and vector representations of input contexts, executed actions, and resulting outcomes, and convert those into formatted training datasets compatible with the language model(s) implementing the AI agents.

In some implementations, the data processing system can partition the data records according to domain identifiers and assign each partition to an AI agent whose operational scope corresponds to that domain. In some implementations, the data processing system can use each partition to generate a corresponding training dataset for the related AI agent(s). For example, the data processing system can generate a training dataset using a subset of manufacturing-related data records containing calibrated performance metrics and use that training dataset to update the parameters of an AI agent dedicated to process optimization.

In some implementations, the data processing system can begin the fine-tuning stage by retrieving high-reward data records (e.g., those corresponding to reward scores greater than a predetermined threshold, etc.) from the shared repository and constructing training batches that include corresponding inputs (e.g., the input context stored as the inputs 174) and output actions (e.g., actions 172 to be used as ground truth data). For example, the data processing system can identify the subset of data records whose scores exceed the threshold and can extract the data for each input-output pair stored in those data records. In some implementations, the data processing system can normalize the extracted data, convert the text into token sequences, and align those tokens with their corresponding embedding dimensions used by the AI agent.

During the fine-tuning process, the data processing system can perform a sequence of operations in which each training example is processed to update model parameters of the AI agent. The data processing system can provide an input context of a training example of a generated training batch as input to the language model of the AI agent. The input context can represent any context data that preceded the corresponding action included in the corresponding data record. The AI agent can process the input context through its language model layers to generate an output action representing a predicted response for the given input sequence. The data processing system can compare the predicted output action with a corresponding ground-truth output action of the training example that has been identified as a high-reward action in the stored data record.

The comparison can determine a deviation between the predicted and ground-truth outputs across token positions and/or numerical dimensions. In some implementations, the data processing system can compute a loss function corresponding to that deviation and apply backpropagation to calculate gradients of the loss with respect to model parameters across successive transformer layers. The gradients can be used to adjust parameter weights of attention and feed-forward layers of the AI agent using an optimizer such as stochastic gradient descent, an Adam optimizer, and/or any other suitable optimization technique. In some implementations, the data processing system can apply a domain-specific learning rate (e.g., specified in configuration settings associated with the AI agent, etc.) for parameter updates.

In some implementations, the data processing system can perform fine-tuning using adaptor layers that modify subsets of model parameters while preserving pretrained base weights of the language model(s) implementing the AI agents. For example, the data processing system can initialize adaptor layers/modules by allocating one or more regions of memory. During fine-tuning, the data processing system can provide batches of training examples constructed as described above to the AI agents while applying the adapter layers. The AI agent can process each training example to generate predicted output tokens, and the data processing system can compare those tokens with ground-truth tokens derived from the stored data records to compute an error gradient/loss, as described herein.

The data processing system can apply the computed gradient across adaptor layer parameters using an optimization algorithm, such as stochastic gradient descent or an Adam optimizer, while the pretrained base weights of the AI agent 120 remain fixed in memory. In some implementations, the adaptor layers can use different learning rate values that are scaled relative to the magnitude of detected gradient changes to stabilize convergence. The adaptor layers and/or the parameters of the language model(s) implementing the AI agent(s) can be iteratively updated through successive forward and backward passes until the training loss computed from the fine-tuning dataset satisfies a convergence threshold and/or another termination condition is reached.

Referring now to FIG. 6, illustrated is a method 600 of generating, storing, retrieving, and using experience data records in a shared repository using AI agents. The method 600 may be performed, for example, by the data processing system 105 and/or the AI agents 120 of FIG. 1. In brief overview of the method 600, the method 600 can include obtaining a set of actions generated by one or more language models based on input data (ACT 605), generating a respective score for each action using at least one reward model (ACT 610), generating a respective data record for each action including representative data, input data, and an outcome (ACT 615), storing each data record in a repository accessible to the language models (ACT 620), generating a query for at least one data record in the repository using a language model (ACT 625), selecting a first data record from the repository based on the query and respective score (ACT 630), and executing the language model using the first data record to generate an output action (ACT 635).

The method 600, at ACT 605, a data processing system (e.g., the data processing system 105) can obtain a set of actions (e.g., actions 172) generated by one or more AI agents (e.g., agents 120) based on input data (e.g., input data 118). To do so, any of the operations of the data obtainer 135 of FIG. 1 can be performed. The input data received by each AI agent can include data representing a current state and/or environmental condition. The AI agent(s) can process the data through an internal reasoning sequence to generate one or more candidate actions. Such processing can include tokenization and transformation of text or numeric information into an internal vector representation that is processed across model layers to produce parameterized outputs. In some implementations, the AI agent can execute tool invocation operations that provide each generated action as a structured command including corresponding contextual parameters. For example, an AI agent operating in a robotics simulation can receive positional coordinates and generate actions specifying actuator displacements for comparison during evaluation. The obtained actions can be recorded as discrete action elements in a temporary memory region prior to scoring.

The method 600, at ACT 610, the data processing system can generate a respective score for each action using at least one reward model (e.g., the reward model 160). To do so, any of the operations of the score generator 140 of FIG. 1 can be performed. Reward scores can be used to quantify the degree to which the action generated via the AI agent at ACT 605 achieved a desired target outcome/objective. The reward model can be used compute a numerical value indicating how closely the outcome of the action, which may be measured (e.g., by the data processing system 105 and/or the AI agents 120 accessing additional input data 118 representing the environment/system with which the AI agents 120 are interacting) aligns with a desired objective measured for the corresponding environment/domain.

In some implementations, multiple reward models are applied, including symbolic, physical, and/or human preference-based models, to produce partial scores that are aggregated into a composite reward value, as described herein. For example, a symbolic model can verify syntactic correctness of code produced by the AI agent, while a physical model can estimate spatial accuracy of a robot arm trajectory. Weighting coefficients (e.g., specified in configuration settings of the AI agent 120 and/or the data processing system 105) can be used such that each partial score contributes proportionally to the composite reward according to the operational domain or application task.

The method 600, at ACT 615, the data processing system can generate a respective data record (e.g., the data record 170) for each action including representative action data (e.g., actions 172), input data (e.g., inputs 174), and an outcome (e.g., an outcome 176). To do so, any of the operations of the data record manager 145 of FIG. 1 can be performed. The data record can be generated by combining the input context that produced the action, the full description of the action, and the measured or simulated outcome generated by executing the action. In some implementations, each data record can be generated to include metadata identifying an agent identifier, a task domain, the assigned reward score generated at ACT 615, among any other metadata described herein. The data records can be stored in ACT 620 such that they are accessible by other agents during subsequent operations.

The method 600, at ACT 620, the data processing system can store each data record in a repository (e.g., the storage 115) accessible to the AI agents. To do so, any of the operations of the data record manager 145 of FIG. 1 can be performed. Storing the data record may include performing any of the operations described in connection with the process of FIG. 4. During storage, in some implementations, text data within the data record can be serialized/converted into a structured format (e.g., a JSON object, etc.) or any other format suitable for text-based matching/search functions. In some implementations, an embedding model can convert the data record into a vector representation capturing semantic relationships among the input, action, and context tokens. The textual and vector representations can be stored concurrently in respective text and vector database partitions of the repository (e.g., the storage 115). Metadata base be stored in corresponding partitions and associated with corresponding text entries and/or embedding entries in the text/vector databases.

The method 600, at ACT 625, the data processing system and/or one or more AI agents can generate a query (e.g., a query 180) for at least one data record in the repository. To do so, any of the operations of the data record manager 145 and/or the model executor 150 of FIG. 1 can be performed. Doing so may also include performing any of the operations described in connection with FIG. 4. For example, during execution of one or more operations, an AI agent may detect a decision point in which historical experience encoded in the repository may be used to inform an optimal next action. The AI agent can encode its current operational context as a textual request and/or a vector embedding to generate the query. In some implementations, the AI agent and/or the data processing system can provide metadata constraints (e.g., a minimum reward threshold, a specific task domain, etc.) in the query. The query can be used in subsequent retrieval operations involving text-based searching, vector searching, or combinations thereof.

The method 600, at ACT 630, the data processing system can select one or more first data records (e.g., data records 170 that are relevant to the query 180) from the repository based on the query and respective score of the one or more data records. To do so, any of the operations of the data record manager 145 and/or the model executor 150 of FIG.

1 can be performed. The first data records can represent the experiences that are most relevant to the decision point that caused the AI agent to generate the query. The selection can occur by ranking one or more candidate data records according to their similarity with the query and their associated reward score. In some implementations, a filtering operation can first remove all data records in the repository below a threshold reward value, after which a vector similarity search returns the highest proximity results relative to the query embedding. In some implementations, hybrid text-based and vector-based searching operations may be performed. In some implementations, text-based searching can be performed without vector searching. Any number (e.g., a predetermined configured number, etc.) of data records can be selected in response to the query.

The method 600, at ACT 635, the data processing system 105 can execute the AI agent using the one or more selected first data records to generate an output action (e.g., an output action 185). To do so, any of the operations of the model executor 150 of FIG. 1 can be performed. For example, the data processing system can generate an augmented input context that combines the current context/state of the AI agent with the data records retrieved/accessed at ACT 630, according to the techniques described herein. The AI agent can receive the retrieved record as part of the augmented input context and can process the augmented input context through internal model layers to generate a structured output specifying a new action sequence (e.g., one or more output actions 185) and/or decision (e.g., generation of additional reasoning output, which may eventually result in output actions 185, etc.). In some implementations, as the retrieved data records have high reward values, it is likely that the retrieved record can guide the AI model toward consistent successful strategies for addressing the decision point that resulted in generation of the query at ACT 620. The resulting output actions can be executed by the data processing system and may be stored as new experience data records, as described herein.

In one non-limiting example of the techniques described herein, a data processing system (e.g., the data processing system 105) can coordinate multiple AI agents (e.g., AI agents 120) operating across a global supply chain of a multinational manufacturing enterprise. The data processing system can instantiate individual agents dedicated to manufacturing optimization, inventory management, transportation and routing, demand forecasting, risk management, and/or sustainability compliance, among other supply chain operations. In some implementations, each agent can execute a domain-specific language model trained or fine-tuned for its operational context, while retaining shared access to a centralized repository (e.g., the storage 115) containing historical production outcomes, logistics schedules, and environmental metrics (e.g., experience data records 170). In some implementations, each agent can generate and retrieve experience data (e.g., experience data records 170) encoded as text and/or vector representations. Metadata included in such experience data structure can include metadata describing production sites, product families, temporal indices, and/or key performance indicators, among others.

In one example, a manufacturing optimization agent can retrieve prior experience data associated with time-critical production reallocation, and a demand forecasting agent can identify earlier periods in which comparable market spikes were encountered across different regions. In some implementations, a transportation and routing agent can execute to generate alternative route plans based on the experience data records in the repository during a geopolitical disruption detected by the data processing system. For example, the transportation and routing agent can issue a semantic retrieval query directed to the shared repository to locate historical experience entries reflecting analogous route disruptions matched by parameters including geopolitical region, shipment type, and/or disruption duration.

For example, prior routing experience data records stored in the repository can describe action-outcome sequences corresponding to detour creation, hub substitution, and/or temporary port reassignment. This data can be used by the transportation and routing agent to infer configuration patterns for current planning (e.g., output actions 185). In some implementations, the risk management agent can retrieve earlier mitigation experience data records for the same region and append contextual indicators to the shared memory structure, which can be consumed by the transportation and routing agent to refine candidate route paths. Each retrieval and update operation can occur concurrently, such that similar experience records can be used by the AI agents across different domains to influence real-time decision generation by the AI agents controlled by the data processing system.

In further implementations, the data processing system can initiate collaborative optimization among the sustainability compliance agent, manufacturing optimization agent, transportation and routing agent, and inventory management agent to construct an enterprise-wide sustainability plan. In a non-limiting example, the sustainability compliance agent can query the repository for previous initiatives classified under low-emission strategy implementations and obtain structured outcomes stored as execution trajectories containing environmental performance results. The manufacturing optimization agent can access corresponding data records indicating energy-efficient production line adjustments. The transportation and routing agent can execute to evaluate experience data records indicating use of multimodal routes prioritizing reduced carbon intensity. The inventory management agent can execute to store data records related to waste minimization and material recovery within distribution centers.

In one non-limiting example of the techniques described herein, the data processing system (e.g., the data processing system 105) and multiple AI agents (e.g., AI agents 120) can operate an adaptive traffic management solution by coordinating a network of AI agents (e.g., AI agents 120) deployed computing systems of a metropolitan transportation grid. Each AI agent can correspond to a specific intersection, corridor, and/or highway segment and can receive continuous sensor data representing traffic density, signal state, and/or vehicle velocity, among other input data (e.g., input data 118). The data processing system can aggregate additional streams from traffic cameras, induction loops, and connected vehicle telemetry to generate an updated operational context (e.g., additional input data 118) for one or more AI agents. In some implementations, the data processing system can further obtain meteorological inputs and/or scheduled event information representing stadium events, concerts, or construction activities, which may be provided as further input data (e.g., input data 118). The contextualized inputs can be converted into high-dimensional embeddings for semantic comparison against experiential data records stored in the shared repository to identify similar operational scenarios. The AI agents can use the retrieved records to generate output actions to adjust signal phasing or control intervals to preemptively balance demand between arterial and feeder routes.

In some implementations, the data processing system can compute immediate performance indicators for each decision (e.g., output actions 185, actions 172, etc.) generated by the AI agents using one or more reward models (e.g., the reward models 160). In such implementations, the reward models generate reward scores according to the techniques described herein, with target objectives corresponding to quantitative parameters such as average intersection throughput, stop-line queue length, pedestrian clearance intervals, and/or measured emissions concentration. In some implementations, the reward models can generate both short-term (e.g., immediate) and long-term evaluation scores (e.g., re-scores, etc.) that correspond respectively to instantaneous flow enhancements and sustained improvements in urban mobility. For example, after an AI agent modifies a signal phase plan to increase green bandwidth on a main corridor, the data processing system can calculate short-term improvements in vehicle delay and cumulative fuel consumption based on sensor readings collected during the next operating cycle. The system can store those computed scores along with corresponding experience data records in the shared experience repository, which may be used by the AI agents to perform subsequent decision operations/output actions.

During scheduled self-improvement phases, the data processing system can execute distributed simulations using a digital twin representation of the metropolitan road network to perform self-play and episodic replay, as described herein. Each AI agent can replicate its decision logic within the simulation environment and interact with virtual counterparts to explore alternative control strategies (e.g., by varying decision parameters via modifying system prompts/instructions, input data 118, etc.) under identical traffic demand profiles. In some implementations, the data processing system can replay historical congestion events via the AI agents and evaluate variant timing strategies to determine which decision paths yield optimal reward outcomes. For example, nightly simulations can be used to compare alternative lane reversal patterns during commuter peaks to quantify long-term effects on average travel time and intersection stability, which may be quantified by corresponding scores generated via the reward models. The simulation results can be analyzed to generate revised reward weights that recalibrate the reward models before redeployment. In some implementations, the updated AI agents can be fine-tuned on the basis of high-reward simulation experiences aggregated by the data processing system, as described in connection with FIG. 5, to improve decision generation accuracy during subsequent live operations across the urban infrastructure.

Figure 7:
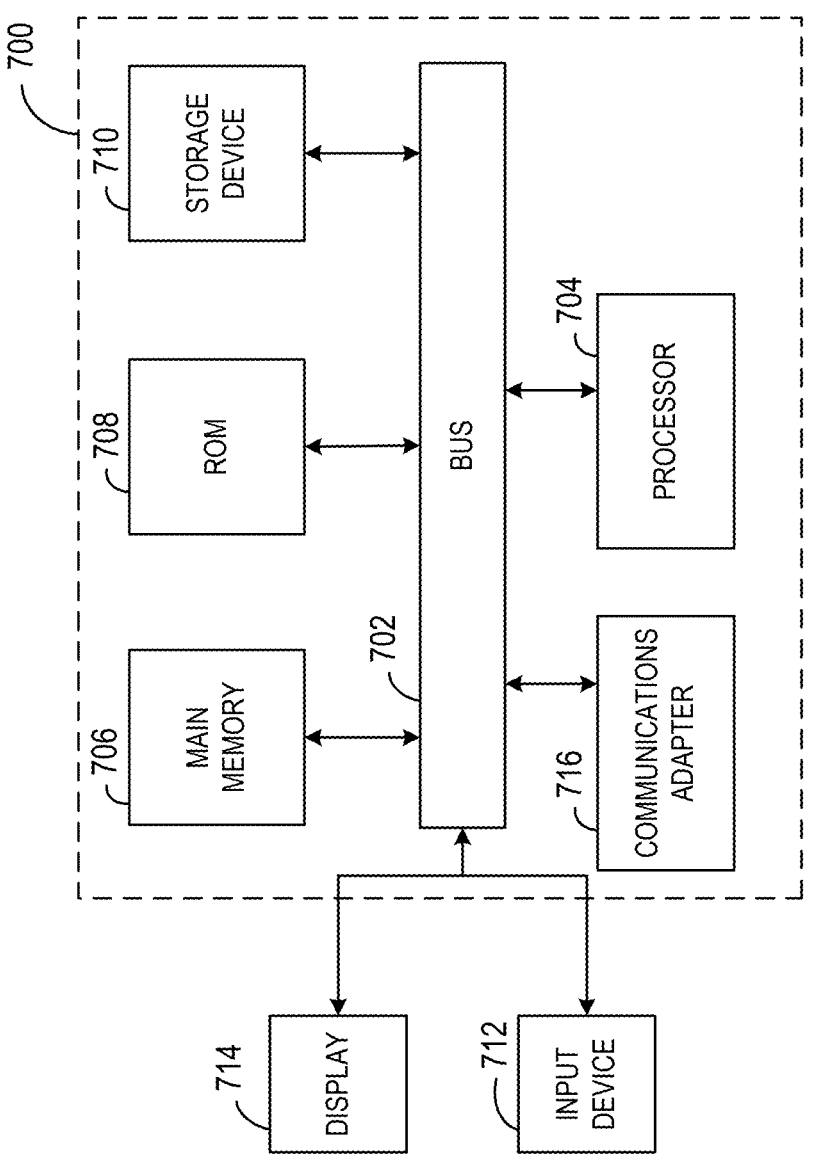
FIG. 7 illustrates a block diagram of an example computing system suitable for use in the various arrangements described herein, in accordance with one or more implementations.

FIG. 7 is a component diagram of an example computing system suitable for use in the various implementations described herein, according to an example implementation. For example, the computing system 700 may implement the data processing system 105 and/or the AI agents 120 of FIG. 1, or various other example systems and devices described in the present disclosure.

The computing system 700 includes a bus 702 or other communication component for communicating information and a processor 704 coupled to the bus 702 for processing information. The computing system 700 also includes main memory 706, such as a RAM or other dynamic storage device, coupled to the bus 702 for storing information, and instructions to be executed by the processor 704. Main memory 706 can also be used for storing position information, temporary variables, or other intermediate information during execution of instructions by the processor 704. The computing system 700 may further include a ROM 708 or other static storage device coupled to the bus 702 for storing static information and instructions for the processor 704. A storage device 710, such as a solid-state device, magnetic disk, or optical disk, is coupled to the bus 702 for persistently storing information and instructions.

The computing system 700 may be coupled via the bus 702 to a display 714, such as a liquid crystal display, or active-matrix display, for displaying information to a user. An input device 712, such as a keyboard including alphanumeric and other keys, may be coupled to the bus 702 for communicating information, and command selections to the processor 704. In another implementation, the input device 712 has a touch screen display. The input device 712 can include any type of biometric sensor, or a cursor control, such as a mouse, a trackball, or cursor direction keys, for communicating direction information and command selections to the processor 704 and for controlling cursor movement on the display 714.

In some implementations, the computing system 700 may include a communications adapter 716, such as a networking adapter. Communications adapter 716 may be coupled to bus 702 and may be configured to enable communications with a computing or communications network or other computing systems. In various illustrative implementations, any type of networking configuration may be achieved using communications adapter 716, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 700 in response to the processor 704 executing an implementation of instructions contained in main memory 706. Such instructions can be read into main memory 706 from another computer-readable medium, such as the storage device 710. Execution of the implementation of instructions contained in main memory 706 causes the computing system 700 to perform the illustrative processes described herein. One or more processors in a multi-processing implementation may also be employed to execute the instructions contained in main memory 706. In alternative implementations, hard-wired circuitry may be used in place of or in combination with software instructions to implement illustrative implementations. Thus, implementations are not limited to any specific combination of hardware circuitry and software.

At least one aspect relates to a system. The system can obtain a set of actions generated by one or more language models based on a set of input data. The system can generate, using at least one reward model, a respective score for each action of the set of actions, the respective score representing a degree to which the action satisfied a corresponding objective. The system can generate, for each action of the set of actions, a respective data record comprising data representative of the action, corresponding input data of the set of input data, an outcome corresponding to the action, and the respective score for the action. The system can store the respective data record for each action of the set of actions in a repository storing a plurality of data records accessible to the one or more language models. The system can generate, using a language model of the one or more language models, a query for at least one data record in the repository, the query generated according to an input context of the language model. The system can select a first data record of the plurality of data records based at least on the respective score of the first data record and a similarity between the query and the first data record. The system can execute the language model using the first data record to generate an output action corresponding to the input context.

In some implementations, the system can generate a vector representation of the data representative of the action, the corresponding input data of the set of input data, an outcome corresponding to the action, and the respective score for the action. In some implementations, the system can store the vector representation in a vector database. In some implementations, the system can select the first data record further based on a vector search operation over the vector database. In some implementations, the system can identify a subset of the plurality of data records based on the respective score of each data record of the plurality of data records. In some implementations, the system can select the first data record from the subset based on the similarity between the query and the first data record.

In some implementations, the system can combine the input context with the data of the first data record to generate an augmented input context. In some implementations, the system can provide the augmented input context as input to the language model. In some implementations, the system can update the repository based on an outcome resulting from the output action generated by the language model. In some implementations, the system can apply a plurality of different reward models to each action of the set of actions to obtain a plurality of partial scores for the action. In some implementations, the system can determine the respective score for the action as a weighted combination of the plurality of partial scores.

In some implementations, the system can store metadata in association with each data record of the plurality of data records, the metadata comprising at least one of a domain identifier, an agent identifier, a timestamp, or an access-level tag. In some implementations, the system can select the first data record of the plurality of data records further based on the agent identifier of the first data record and an identifier of the language model. In some implementations, the system can apply a decay function to the respective score of each data record of the plurality of data records based on an age of the data record.

At least one other aspect relates to a method. The method can be performed, for example, by one or more processors coupled to non-transitory memory. The method can include obtaining a set of actions generated by one or more language models based on a set of input data. The method can include generating, using at least one reward model, a respective score for each action of the set of actions, the respective score representing a degree to which the action satisfied a corresponding objective. The method can include generating, for each action of the set of actions, a respective data record comprising data representative of the action, corresponding input data of the set of input data, an outcome corresponding to the action, and the respective score for the action. The method can include storing the respective data record for each action of the set of actions in a repository storing a plurality of data records accessible to the one or more language models. The method can include generating, using a language model of the one or more language models, a query for at least one data record in the repository, the query generated according to an input context of the language model. The method can include selecting a first data record of the plurality of data records based at least on the respective score of the first data record and a similarity between the query and the first data record. The method can include executing the language model using the first data record to generate an output action corresponding to the input context.

In some implementations, the method can include generating a vector representation of the data representative of the action, the corresponding input data of the set of input data, an outcome corresponding to the action, and the respective score for the action. In some implementations, the method can include storing the vector representation in a vector database. In some implementations, the method can include selecting the first data record further based on a vector search operation over the vector database. In some implementations, the method can include identifying a subset of the plurality of data records based on the respective score of each data record of the plurality of data records. In some implementations, the method can include selecting the first data record from the subset based on the similarity between the query and the first data record.

In some implementations, the method can include combining the input context with the data of the first data record to generate an augmented input context. In some implementations, the method can include providing the augmented input context as input to the language model. In some implementations, the method can include updating the repository based on an outcome resulting from the output action generated by the language model. In some implementations, the method can include applying a plurality of different reward models to each action of the set of actions to obtain a plurality of partial scores for the action. In some implementations, the method can include determining the respective score for the action as a weighted combination of the plurality of partial scores.

In some implementations, the method can include storing metadata in association with each data record of the plurality of data records, the metadata comprising at least one of a domain identifier, an agent identifier, a timestamp, or an access-level tag. In some implementations, the method can include selecting the first data record of the plurality of data records further based on the agent identifier of the first data record and an identifier of the language model. In some implementations, the method can include applying a decay function to the respective score of each data record of the plurality of data records based on an age of the data record.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objec- tives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A system, comprising:

one or more processors coupled to non-transitory memory, the one or more processors configured to:

obtain a set of actions generated by one or more language models based on a set of input data, each action comprising a tool invocation or control command configured, when executed, to cause a measurable change in a simulated or physical environment;

generate, using at least one reward model, a respective score for each action of the set of actions, the respective score representing a degree to which an outcome corresponding to a respective measurable change of the action satisfied a corresponding objective;

generate, for each action of the set of actions, a respective data record comprising data representative of the action, corresponding input data of the set of input data, an outcome corresponding to the action, and the respective score for the action;

store the respective data record for each action of the set of actions in a repository storing a plurality of data records accessible to the one or more language models;

generate, using a language model of the one or more language models, a query for at least one data record the repository, the query generated according to an input context of the language model;

select a first data record of the plurality of data records, the first data record representing a prior action and a prior outcome, based at least on the respective score of the first data record, the respective score indicating a magnitude to which the prior outcome satisfied an objective corresponding to the input context based on which the query was generated, and a similarity between the query and the first data record; and execute the language model using the first data record to generate an output action corresponding to the input context.

2. The system of claim 1, wherein the one or more processors are further configured to:

generate a vector representation of the data representative of the action, the corresponding input data of the set of input data, an outcome corresponding to the action, and the respective score for the action; and store the vector representation in a vector database.

3. The system of claim 2, wherein the one or more processors are further configured to:

select the first data record further based on a vector search operation over the vector database.

4. The system of claim 1, wherein the one or more processors are further configured to:

identify a subset of the plurality of data records based on the respective score of each data record of the plurality of data records; and select the first data record from the subset based on the similarity between the query and the first data record.

5. The system of claim 1, wherein the one or more processors are further configured to:

combine the input context with the data of the first data record to generate an augmented input context; and provide the augmented input context as input to the language model.

6. The system of claim 1, wherein the one or more processors are further configured to:

update the repository based on an outcome resulting from the output action generated by the language model.

7. The system of claim 1, wherein the one or more processors are further configured to:

apply a plurality of different reward models to each action of the set of actions to obtain a plurality of partial scores for the action; and determine the respective score for the action as a weighted combination of the plurality of partial scores.

8. The system of claim 1, wherein the one or more processors are further configured to:

store metadata in association with each data record of the plurality of data records, the metadata comprising at least one of a domain identifier, an agent identifier, a timestamp, or an access-level tag.

9. The system of claim 8, wherein the one or more processors are further configured to:

select the first data record of the plurality of data records further based on the agent identifier of the first data record and an identifier of the language model.

10. The system of claim 1, wherein the one or more processors are further configured to:

apply a decay function to the respective score of each data record of the plurality of data records based on an age of the data record.

11. A method, comprising:

obtaining, by one or more processors coupled to non-transitory memory, a set of actions generated by one or more language models based on a set of input data, each action comprising a tool invocation or control command configured, when executed, to cause a measurable change in a simulated or physical environment;

generating, by the one or more processors, using at least one reward model, a respective score for each action of the set of actions, the respective score representing a degree to which an outcome corresponding to a respective measurable change of the action satisfied a corresponding objective;

generating, by the one or more processors, for each action of the set of actions, a respective data record comprising data representative of the action, corresponding input data of the set of input data, an outcome corresponding to the action, and the respective score for the action;

storing, by the one or more processors, the respective data record for each action of the set of actions in a repository storing a plurality of data records accessible to the one or more language models;

generating, by the one or more processors, using a language model of the one or more language models, a query for at least one data record in the repository, the query generated according to an input context of the language model;

selecting, by the one or more processors, a first data record of the plurality of data records, the first data record representing a prior action and a prior outcome, based at least on the respective score of the first data record, the respective score indicating a magnitude to which the prior outcome satisfied an objective corresponding to the input context based on which the query was generated, and a similarity between the query and the first data record; and executing, by the one or more processors, the language model using the first data record to generate an output action corresponding to the input context.

12. The method of claim 11, further comprising generating, by the one or more processors, a vector representation of the data representative of the action, the corresponding input data of the set of input data, an outcome corresponding to the action, and the respective score for the action, and storing, by the one or more processors, the vector representation in a vector database.

13. The method of claim 12, further comprising selecting, by the one or more processors, the first data record further based on a vector search operation over the vector database.

14. The method of claim 11, further comprising identifying, by the one or more processors, a subset of the plurality of data records based on the respective score of each data record of the plurality of data records, and selecting, by the one or more processors, the first data record from the subset based on the similarity between the query and the first data record.

15. The method of claim 11, further comprising combining, by the one or more processors, the input context with the data of the first data record to generate an augmented input context, and providing, by the one or more processors, the augmented input context as input to the language model.

16. The method of claim 11, further comprising updating, by the one or more processors, the repository based on an outcome resulting from the output action generated by the language model.

17. The method of claim 11, further comprising applying, by the one or more processors, a plurality of different reward models to each action of the set of actions to obtain a plurality of partial scores for the action, and determining, by the one or more processors, the respective score for the action as a weighted combination of the plurality of partial scores.

18. The method of claim 11, further comprising storing, by the one or more processors, metadata in association with each data record of the plurality of data records, the metadata comprising at least one of a domain identifier, an agent identifier, a timestamp, or an access-level tag.

19. The method of claim 18, further comprising selecting, by the one or more processors, the first data record of the plurality of data records further based on the agent identifier of the first data record and an identifier of the language model.

20. A non-transitory computer-readable medium storing instructions that, when executed by one or more processors, cause the one or more processors to perform operations comprising:

obtaining a set of actions generated by one or more language models based on a set of input data, each action comprising a tool invocation or control command configured, when executed, to cause a measurable change in a simulated or physical environment;

generating, using at least one reward model, a respective score for each action of the set of actions, the respective score representing a degree to which an outcome corresponding to a respective measurable change of the action satisfied a corresponding objective;

generating, for each action of the set of actions, a respective data record comprising data representative of the action, corresponding input data of the set of input data, an outcome corresponding to the action, and the respective score for the action;

storing the respective data record for each action of the set of actions in a repository storing a plurality of data records accessible to the one or more language models;

generating, using a language model of the one or more language models, a query for at least one data record in the repository, the query generated according to an input context of the language model;

selecting a first data record of the plurality of data records, the first data record representing a prior action and a prior outcome, based at least on the respective score of the first data record and a similarity between the query and the first data record, the respective score indicating a magnitude to which the prior outcome satisfied an objective corresponding to the input context based on which the query was generated, determined based at least on a vector search operation; and executing the language model using the first data record to generate an output action corresponding to the input context.

\* \* \* \* \*